(12) United States Patent
Choe et al.

(10) Patent No.: US 11,005,900 B2
(45) Date of Patent: May 11, 2021

(54) NOTIFICATIONS TO ALL DEVICES TO UPDATE STATE

(71) Applicant: Microsoft Technology Licensing, LLC, Redmond, WA (US)

(72) Inventors: Calvin Choe, Redmond, WA (US); Michael Kostersitz, Snohomish, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/707,438

(22) Filed: Sep. 18, 2017

(65) Prior Publication Data

US 2019/0089752 A1    Mar. 21, 2019

(51) Int. Cl.
*H04L 29/06* (2006.01)
*H04L 29/08* (2006.01)
*H04L 12/28* (2006.01)

(52) U.S. Cl.
CPC ...... *H04L 65/1096* (2013.01); *H04L 12/2829* (2013.01); *H04L 65/1006* (2013.01); *H04L 65/1059* (2013.01); *H04L 65/1083* (2013.01); *H04L 67/025* (2013.01);
(Continued)

(58) Field of Classification Search
CPC ............. H04L 65/1096; H04L 12/2829; H04L 65/1006; H04L 65/1059; H04L 65/1083; H04L 67/025; H04L 67/142; H04L 65/1016; H04L 67/18
See application file for complete search history.

(56) References Cited

U.S. PATENT DOCUMENTS 5,544,321 A    8/1996 Theimer et al.
6,721,412 B1   4/2004 Youngs
(Continued)

FOREIGN PATENT DOCUMENTS

DE    19849194 A1    4/2000
WO    0039964 A1     7/2000

OTHER PUBLICATIONS

"International Search Report and Written Opinion Issued in PCT Application No. PCT/US2018/038871", dated Sep. 4, 2018, 10 Pages.
(Continued)

*Primary Examiner* — Huy D Vu
*Assistant Examiner* — Bailor C. Hsu
(74) *Attorney, Agent, or Firm* — Mark K. Young; Mayer & Williams, PC

(57) ABSTRACT

A device state service supported on an application server is disclosed herein. The device state service is configured to dynamically monitor a device state across devices, and particularly monitor whether or not a device is currently active (e.g., incoming or outgoing ringing, incoming or outgoing busy signal, audio and/or video call in progress, etc.) The active device transmits device state data along with context data and sensor data (collectively "real-time data"). The inactive (or subject) devices may likewise transmit real-time data to the device state service. The device state service determines an action for the subject and/or active devices to perform based on the received real-time data. For example, when a user's smartphone is currently active (e.g., a call in-progress), the user's tablet may enter a power save mode to save resources.

20 Claims, 34 Drawing Sheets

(52) U.S. Cl.
CPC ........ *H04L 67/142* (2013.01); *H04L 65/1016* (2013.01); *H04L 67/18* (2013.01)

(56) References Cited

U.S. PATENT DOCUMENTS

| | | | |
|---|---|---|---|
| 6,725,281 B1 * | 4/2004 | Zintel | H04L 12/2803 |
| | | | 709/217 |
| 7,539,127 B1 * | 5/2009 | Shaffer | H04L 65/1083 |
| | | | 370/216 |
| 7,653,191 B1 | 1/2010 | Glasser et al. | |
| 7,769,155 B2 | 8/2010 | Radziewicz et al. | |
| 8,060,139 B2 | 11/2011 | Yaqub et al. | |
| 8,073,123 B2 * | 12/2011 | Mamakos | H04L 41/5025 |
| | | | 379/201.02 |
| 8,300,559 B2 * | 10/2012 | Ezell | H04M 3/42323 |
| | | | 370/261 |
| 8,401,163 B1 | 3/2013 | Kirchhoff et al. | |
| 8,638,917 B2 | 1/2014 | Jano | |
| 9,014,703 B1 | 4/2015 | Edara | |
| 9,060,059 B2 * | 6/2015 | Foster | H04M 3/42374 |
| 9,106,721 B2 | 8/2015 | Quan | |
| 9,414,113 B2 * | 8/2016 | Li | H04N 21/2389 |
| 9,530,116 B2 * | 12/2016 | Khalil | H04M 3/5183 |
| 9,753,796 B2 * | 9/2017 | Mahaffey | G06F 11/0766 |
| 10,064,030 B2 * | 8/2018 | Park | H04W 4/80 |
| 2003/0046433 A1 | 3/2003 | Luzzatti et al. | |
| 2006/0211423 A1 * | 9/2006 | Ejzak | H04W 68/00 |
| | | | 455/445 |
| 2007/0123287 A1 | 5/2007 | Mock et al. | |
| 2007/0297373 A1 * | 12/2007 | Saifullah | H04W 48/18 |
| | | | 370/338 |
| 2008/0186929 A1 * | 8/2008 | Rice | H04L 67/24 |
| | | | 370/338 |
| 2015/0065097 A1 | 3/2015 | Nguyen et al. | |
| 2015/0149566 A1 * | 5/2015 | Shmilov | H04W 4/12 |
| | | | 709/206 |
| 2015/0163295 A1 * | 6/2015 | Shmilov | H04M 3/58 |
| | | | 370/271 |
| 2015/0188954 A1 * | 7/2015 | Sommerwerk | H04M 3/487 |
| | | | 455/411 |
| 2016/0057615 A1 | 2/2016 | Naftolin | |
| 2017/0230236 A1 * | 8/2017 | Kim | H04L 41/08 |

OTHER PUBLICATIONS

Reardon, Marguerite, "T-Mobile and Sprint to allow one phone number for multiple devices", Published on: Oct. 15, 2015 Available at: http://www.cnet.com/news/t-mobile-and-sprint-to-allow-one-phone-number-for-multiple-devices/ (2 pages total).

* cited by examiner

200

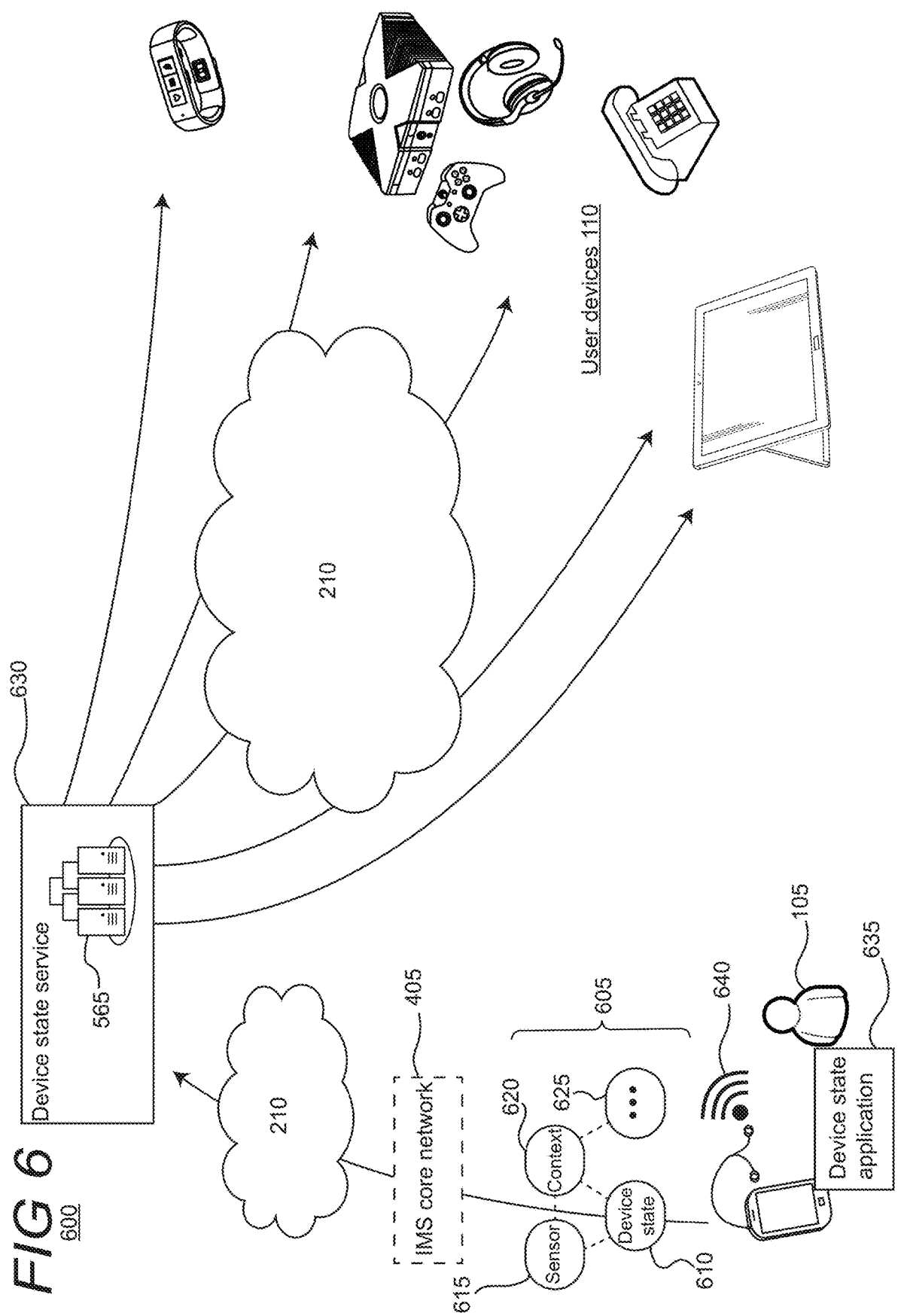

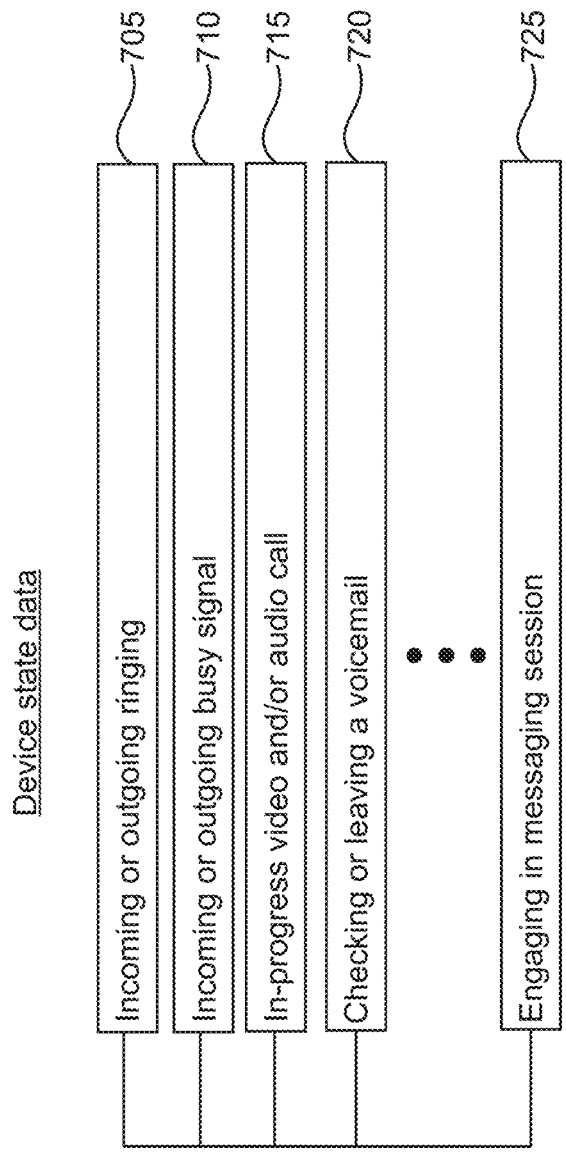

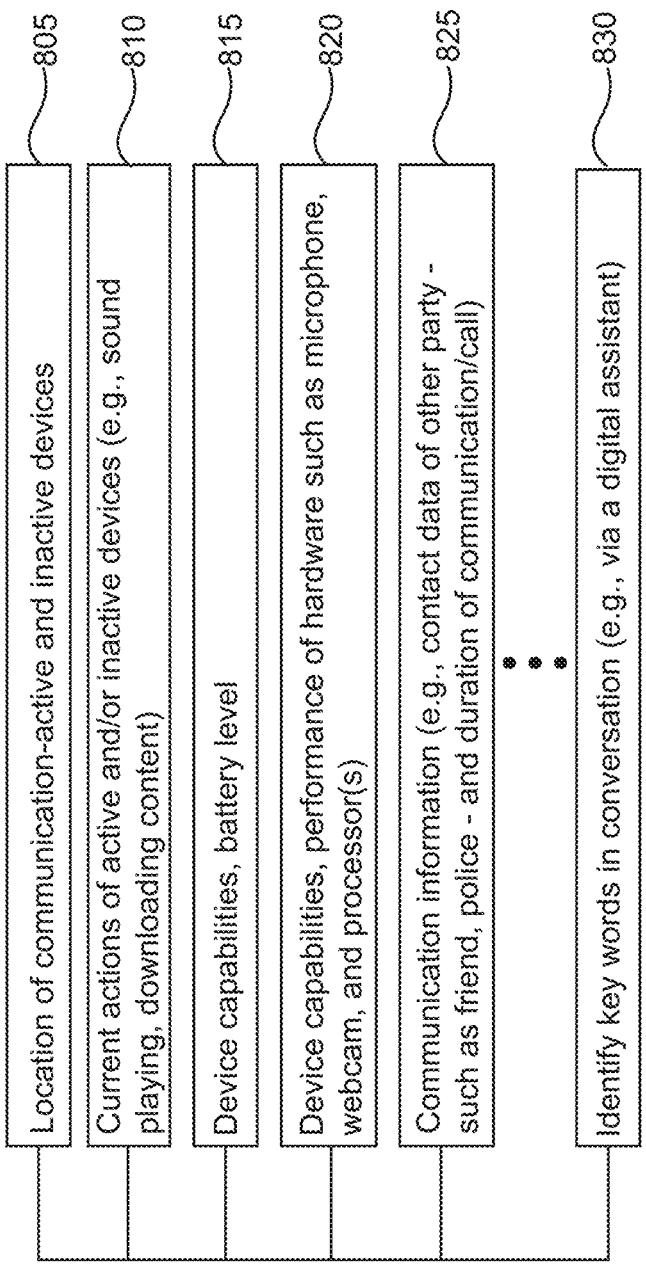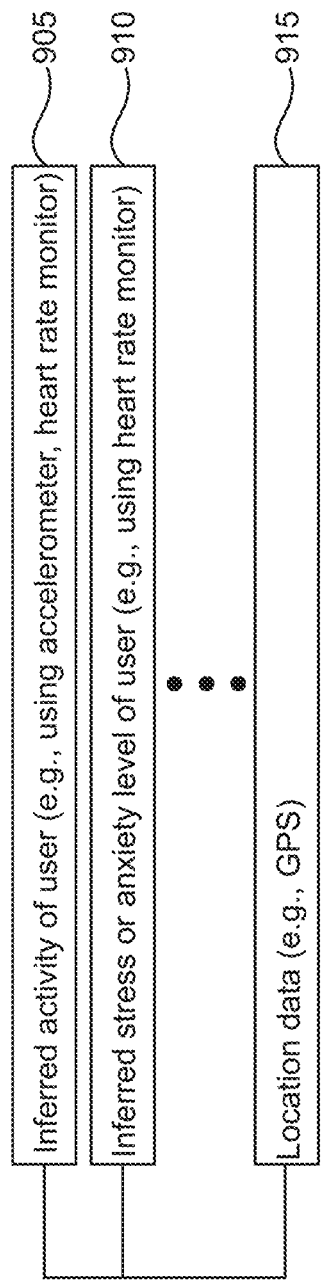

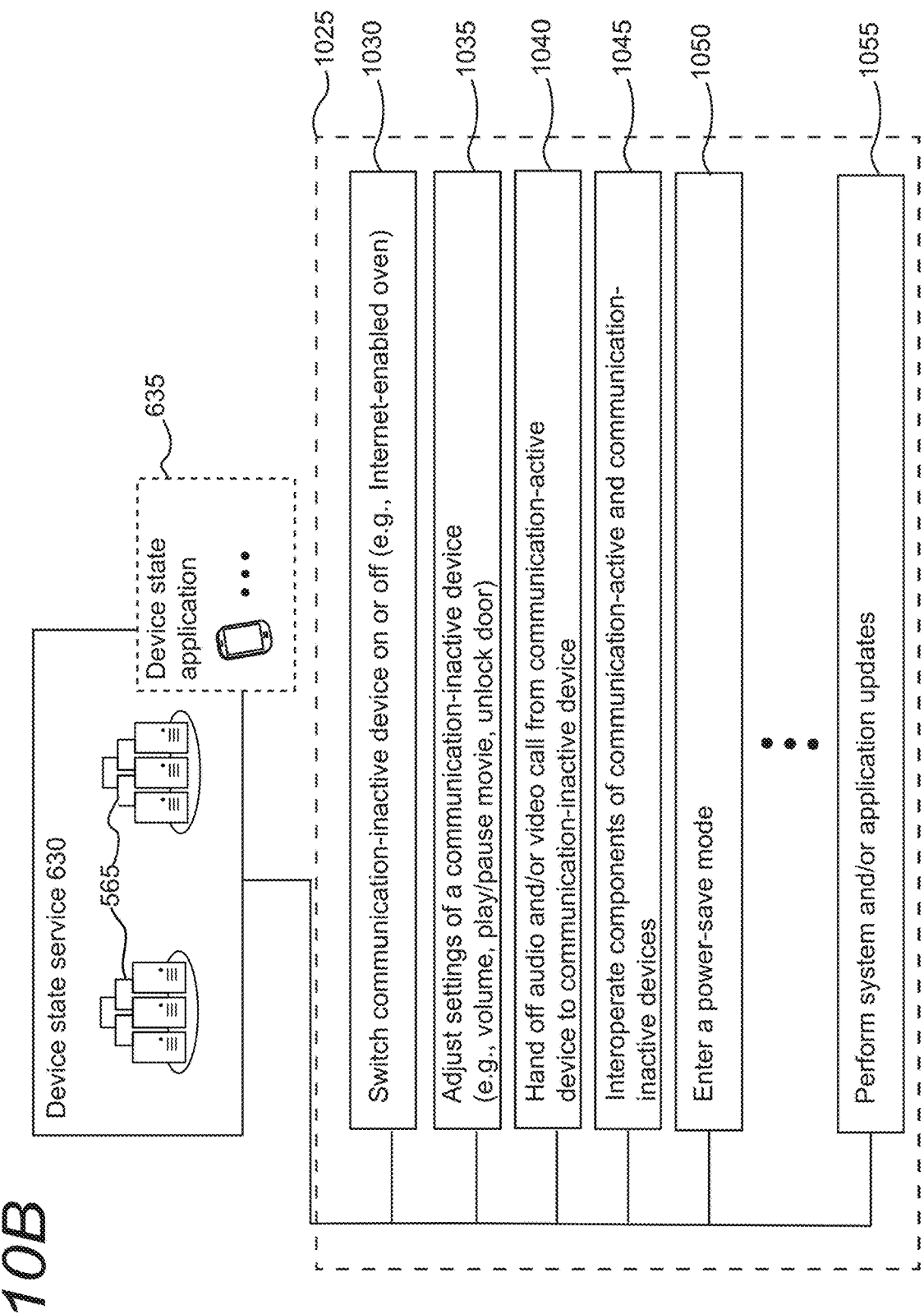

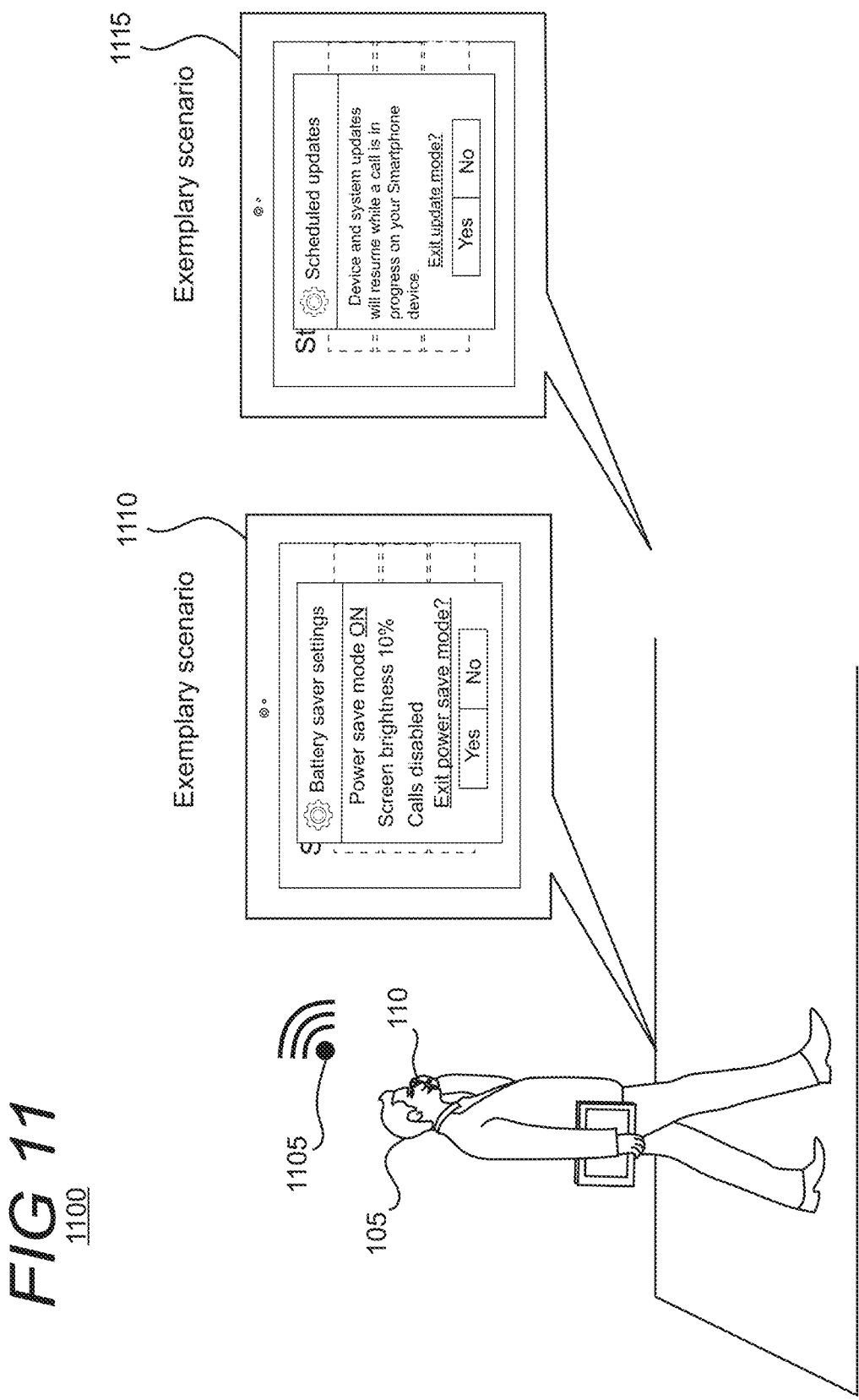

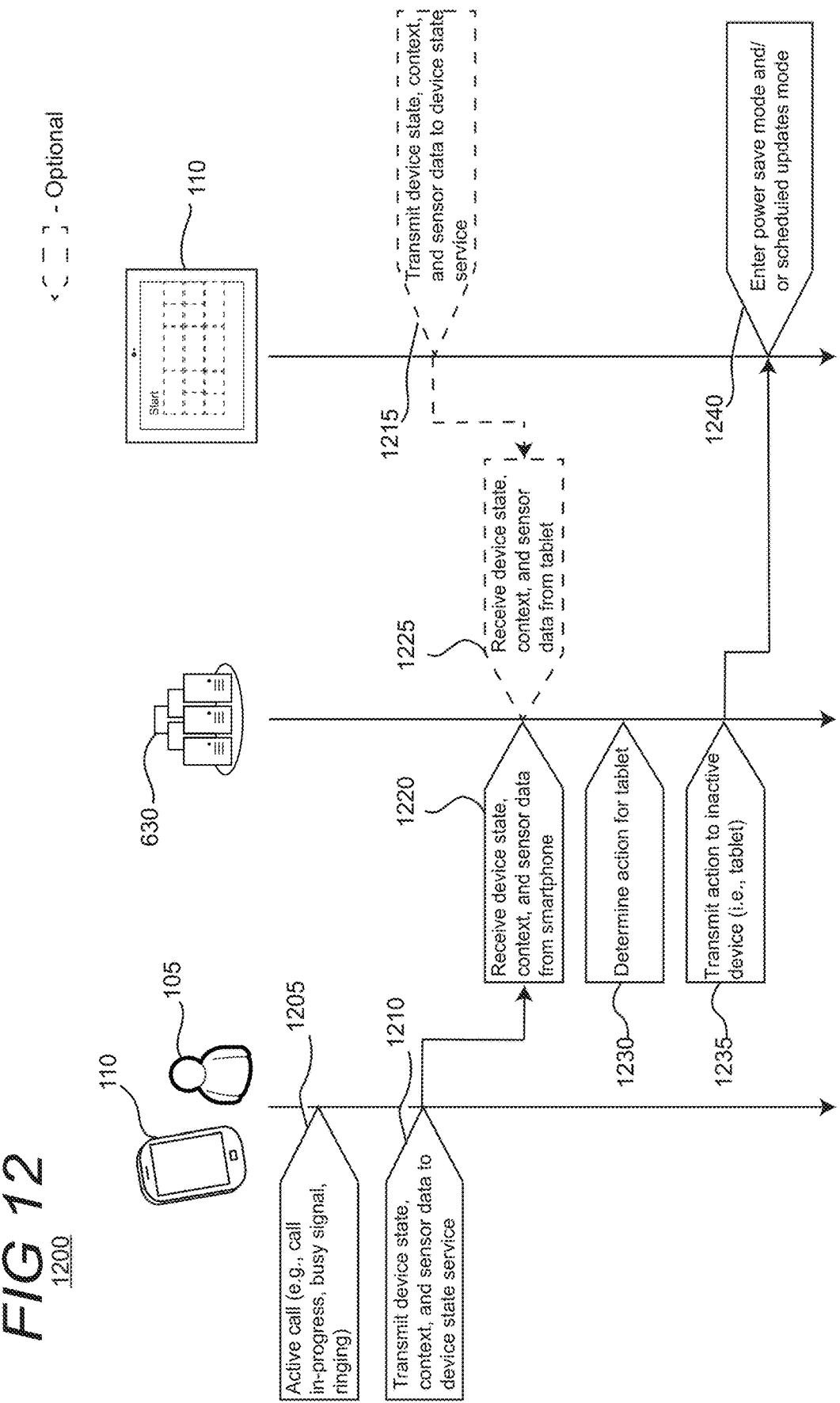

1300

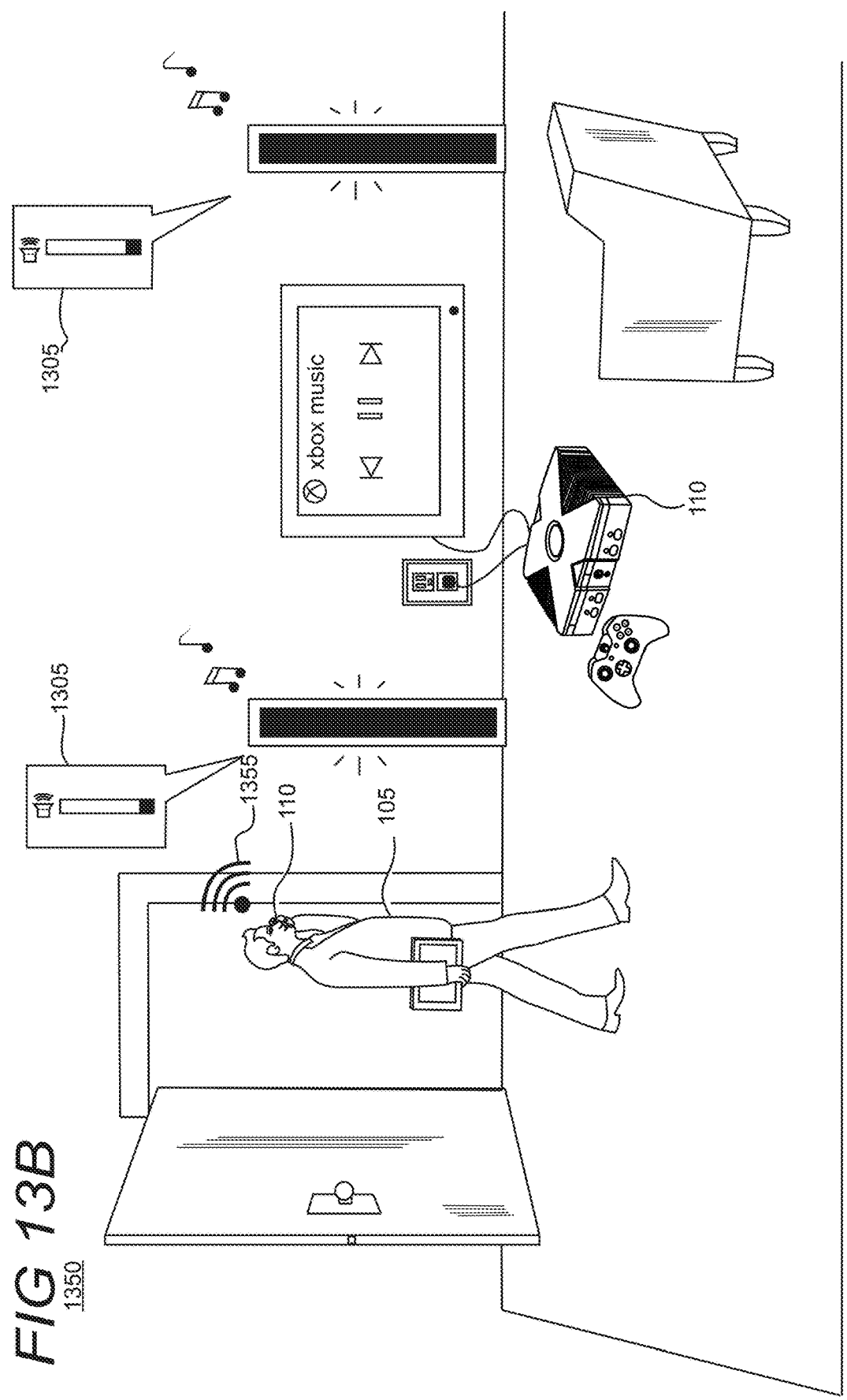

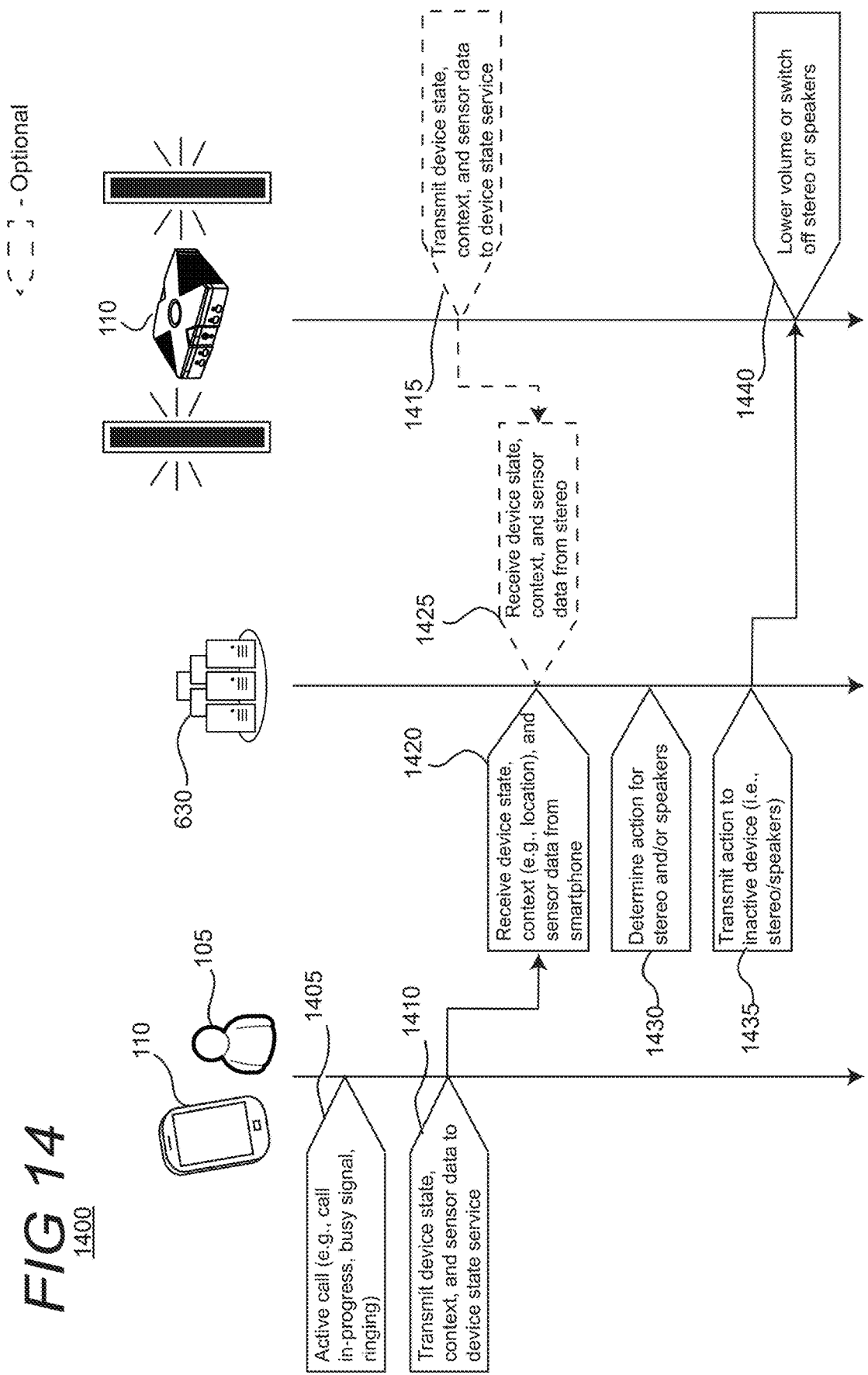

1500

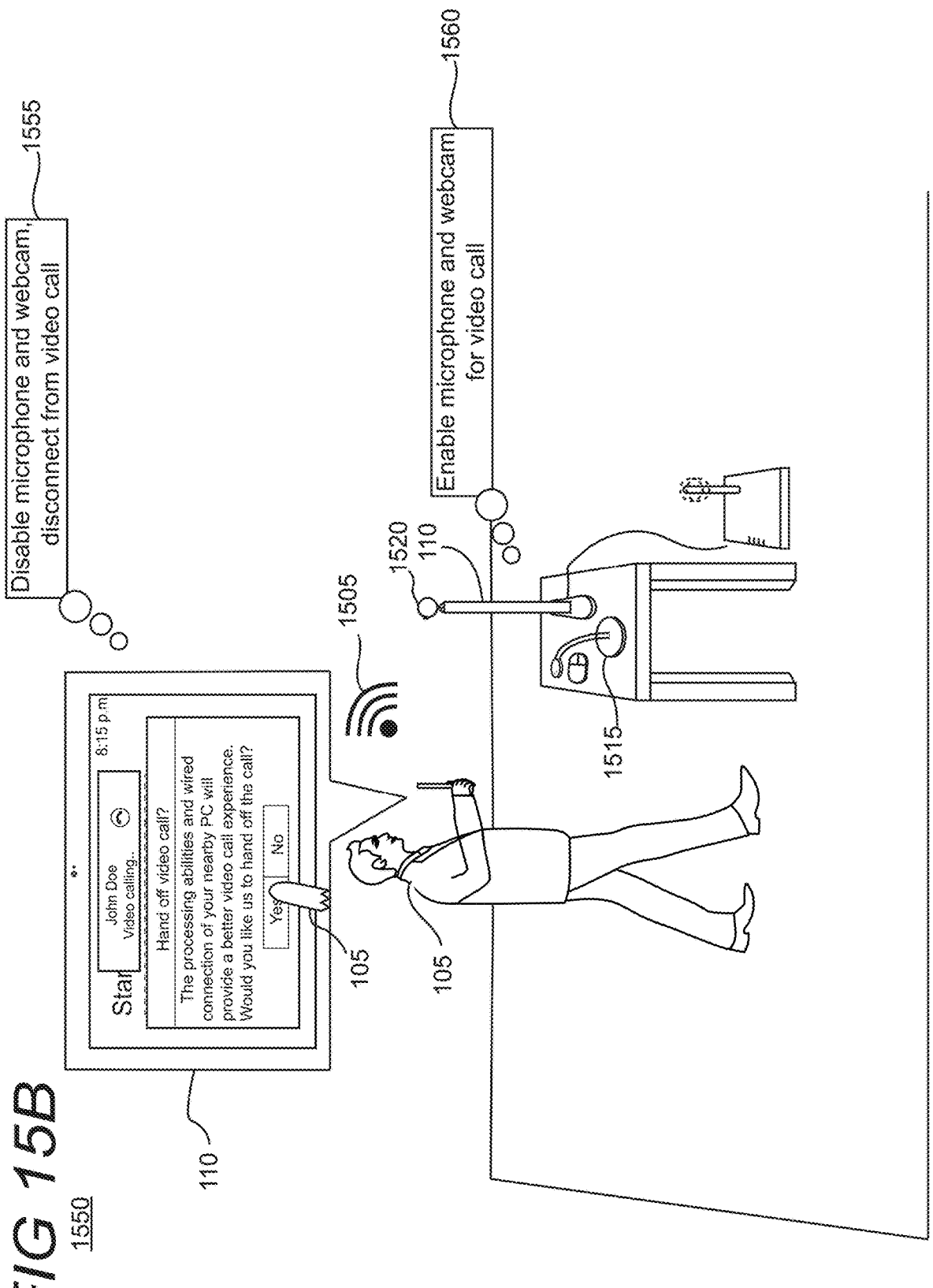

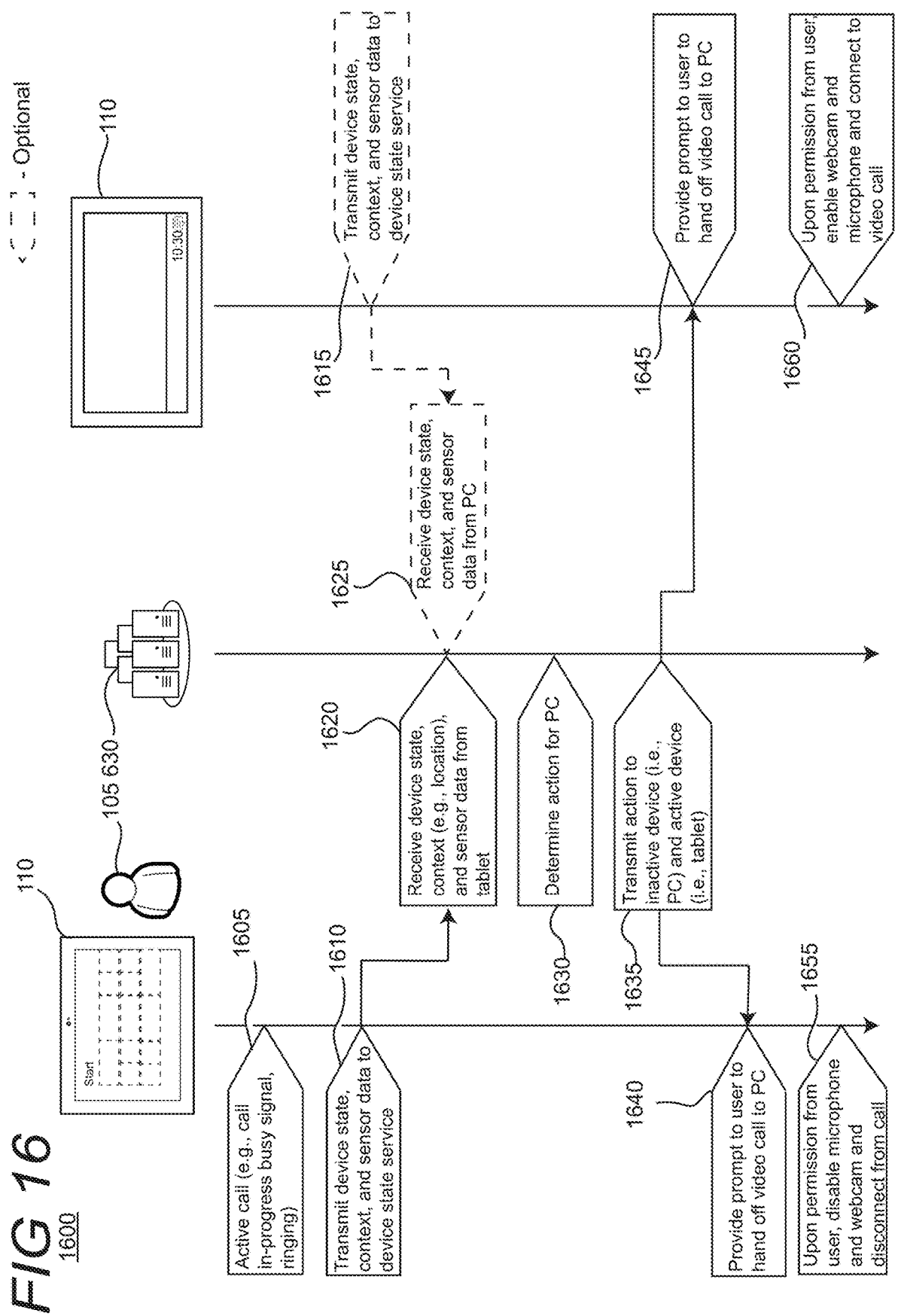

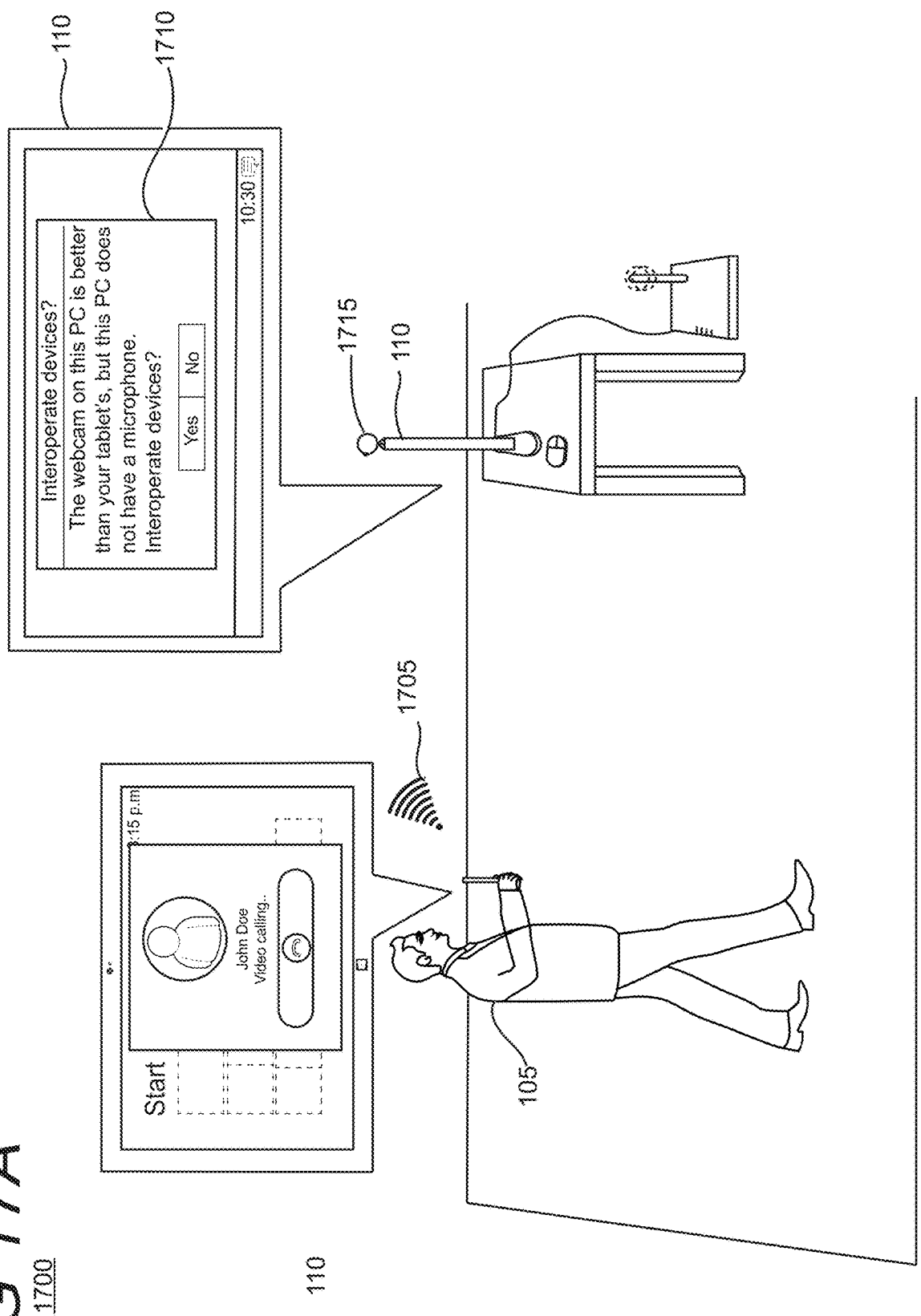

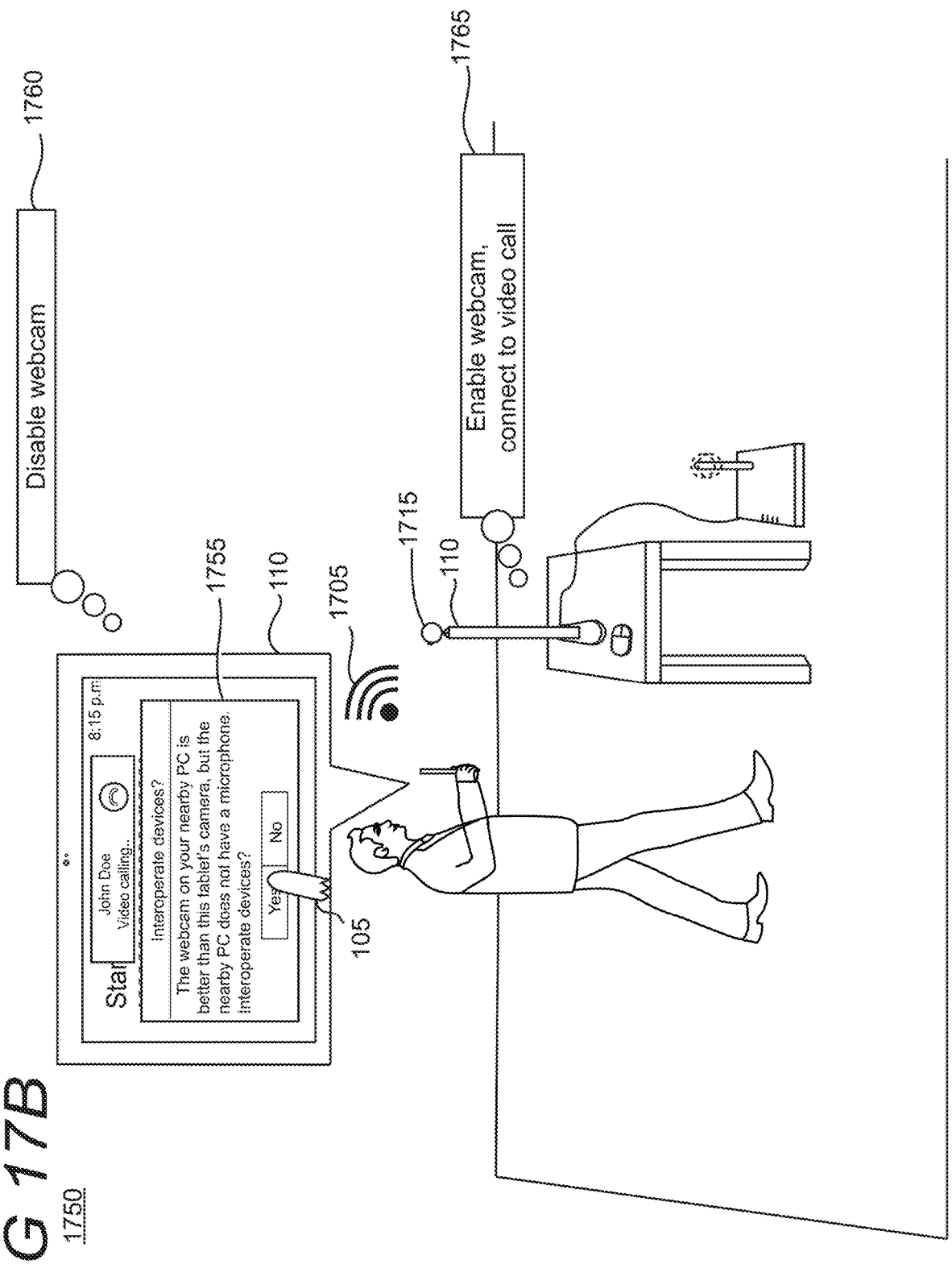

1800

1900

2500

2900

NOTIFICATIONS TO ALL DEVICES TO UPDATE STATE

BACKGROUND

Users can be associated with multiple devices which may be configured to communicate with each other and application servers over various networks, including the Internet. Devices can also be configured with telephony capabilities for making and receiving audio and/or video calls.

SUMMARY

A device state service supported on an application server is configured to collect device state, context, and sensor data from a user's device that is currently engaged in an audio or video call or a messaging session (referred to as a "communication-active" device) to determine and communicate actions to be performed by one or more of the user's devices that are not engaged on the call or messaging session (referred to as "communication-inactive" devices). The communication can include communications over a telephony network, VoIP (Voice-over Internet Protocol) network, a messaging platform, or any combination thereof. The messaging platform can include third-party applications, text messaging applications, or applications that are configured to transmit and receive messages along with providing audio and video call capabilities (e.g., Skype® by Microsoft®). The device state service can forward the collected data to each of the communication-inactive devices which may use the data to determine actions to perform. The user's communication-active and communication-inactive devices may operate over an IMS (Internet Protocol Multimedia Subsystem) core network and communicate with the device state service. With notice to the user and user consent, the device state service may be configured to collect communication or call state information for the user's various devices including, for example, call in-progress, ringing or alerts, busy or network signals, call state associated with checking or leaving voicemail, and the transmission or receipt of messages.

Each device may support a local device state application. When a user engages in a communication, such as a call, the device state application triggers the communication-active device to forward current device state data, along with context data and sensor data to the remote device state service in real time. The context data can include, for example, a location of the communication-active and communication-inactive devices; current actions of the communication-active and/or communication-inactive devices (e.g., playing music, downloading content); device capabilities such as battery level; and performance capabilities of hardware such as microphone, webcam, and processor. The sensor data can indicate activities or conditions of a user (e.g., using an accelerometer and heart rate monitor), the location of the user (e.g., using a global positioning system (GPS) sensor), and the user's stress or anxiety levels (e.g., using the heart rate monitor or mood sensor). Device state data, context data, and sensor data is collectively referred to as "real-time data."

When the device state service collects the real-time data indicating that one of the devices is currently communication-active, the service may determine and communicate actions to be performed by communication-inactive devices. In addition, the service may use the collected real-time data to determine and communicate actions to be performed by the communication-active device. In an illustrative example, when the user is on a call with a smartphone, the device state service may utilize the real-time data to determine that the communication-active smartphone device and a communication-inactive device, such as a multimedia system playing music, are currently located in the same room. The device state service may send a signal to the user's multimedia system to lower the volume or switch it off so as not to interfere with the smartphone call. Alternatively, the device state service may forward the real-time data from the communication-active device to a communication-inactive device. When the communication-inactive device receives the real-time data, the device state application stored thereon may independently determine and perform an action, such as lowering the volume or switching the device off.

In another illustrative example, the user's communication-inactive device may enter an alternative operating mode when it becomes aware from the forwarded real-time data that another device is currently active on a communication. Alternative operating modes can include, for example, a power save mode to preserve battery life, or an update mode in which operating system and application updates, disk maintenance, and the like can be performed on the device without risk of disruption to an active call or communication. In addition, a user interface (UI) may be configured to expose actions that are determined and/or recommended by the service and enable the user to accept or reject such actions. For example, the user may choose to exit the power save mode and/or the update mode, and thereby revert to previous operating modes.

Sharing communication and other state information across the user's devices and triggering the performance of responsive actions at the communication-active and communication-inactive devices enables devices to intelligently act and work together to enhance the quality of user-device interactions. In the multimedia system example above, the device state service automatically identifies a context in which the user's devices can interoperate to minimize distractions to the user's smartphone call. Knowledge of global call state also enables individual device operations to be optimized so that network bandwidth, processor cycles, power, memory usage, etc., can be efficiently utilized. In the alternative operating mode example above, a device can perform an update when it is communication-inactive so that system resources are fully utilizable during resource-intensive activities such as high-resolution conference calling when the device is communication-active.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 6 shows an illustrative architecture of a device state service collecting data from one device and forwarding the received data to other devices associated with the same user;

FIGS. 7-9 show illustrative examples of device state data, context data, and sensor data, respectively;

FIG. 10B shows exemplary actions determined to be performed by a communication-active and/or communication-inactive device;

FIG. 11 shows an illustrative action executed by a tablet in response to an active call on the user's smartphone;

FIG. 12 shows illustrative processes performed by the smartphone, device state service, and tablet of FIG. 11;

FIG. 13B shows an illustrative response of the multimedia system when the user enters the room while the smartphone is active on a call;

FIG. 14 shows illustrative processes performed by the smartphone, device state service, and stereo system of FIGS. 13A-B;

FIG. 15B shows the tablet and PC enabling and disabling components in response to the user's approval to hand off the video call from the tablet to the PC;

FIG. 16 shows illustrative processes performed by the tablet, device state service, and PC of FIGS. 15A-B;

FIG. 17A shows another illustrative scenario where the user video calls John Doe and the PC provides a window to the user to interoperate with the tablet and PC;

FIG. 17B shows the tablet and PC enabling and disabling components in response to the user's approval to interoperate with the devices;

Like reference numerals indicate like elements in the drawings. Elements are not drawn to scale unless otherwise indicated.

DETAILED DESCRIPTION

Figure 1:
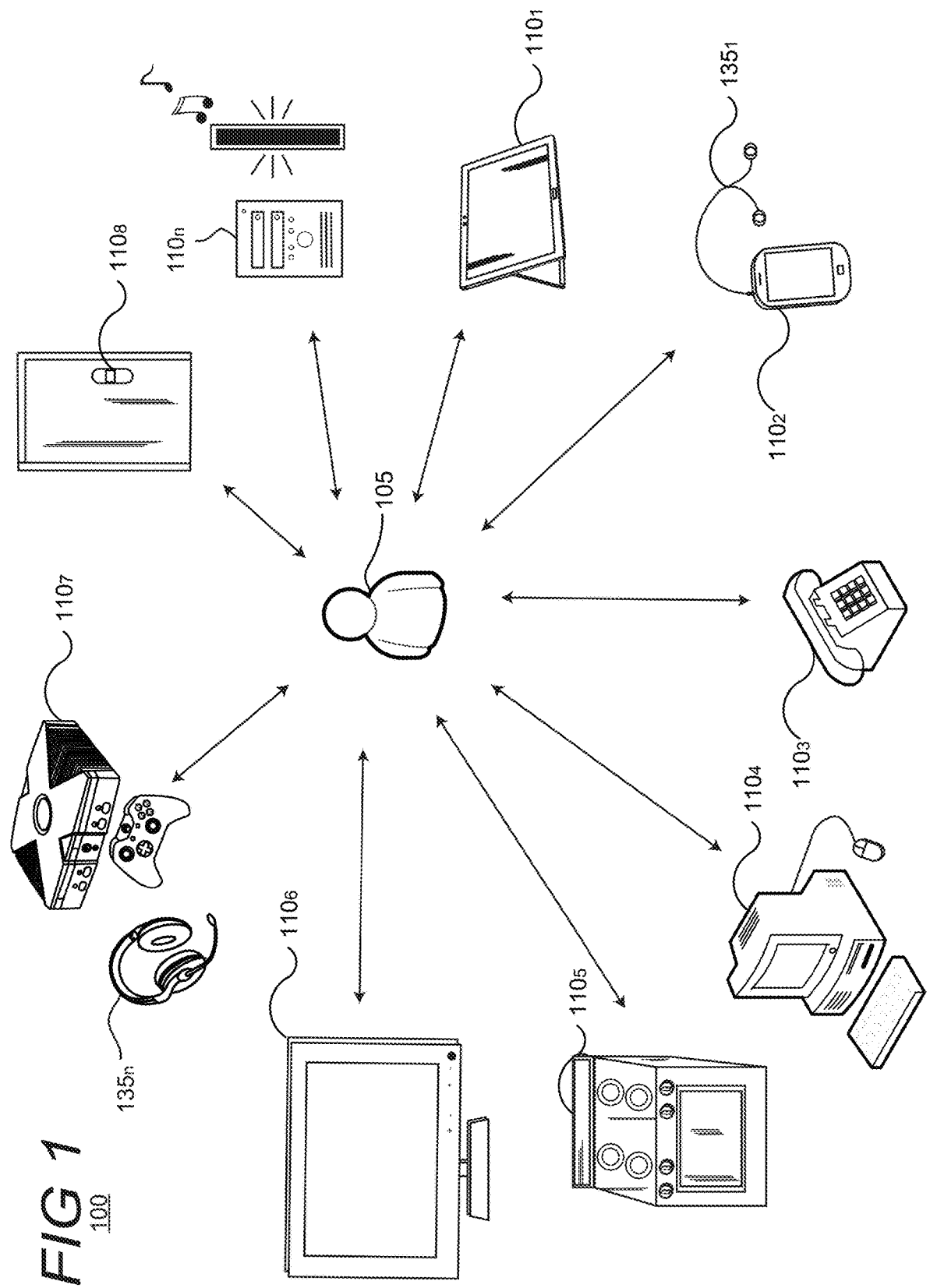
FIG. 1 shows an illustrative environment in which a single user can be associated with a plurality of devices.

FIG. 1 shows an illustrative environment 100 in which a single user 105 can be associated with a plurality of devices 110. The devices 110 can include a game console, personal computer (PC), tablet, smartphone, television (e.g., smart television), wearable device, home telephone, smart oven, stereo system, and smart door lock. These devices 110 can support telephony capabilities (e.g., voice and/or video, text, or chat) and typically support data-consuming applications such as Internet browsing and multimedia (e.g., music, video, etc.) consumption in addition to various other features. Alternatively, the devices can at least be connected to the Internet and capable of storing and executing applications. These devices 110 may be used by users to make and receive voice and/or video calls, share multimedia, engage in messaging (e.g., texting) and email communications, use applications, and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, multimedia consoles, or the like. In the discussion that follows, the use of the term "device" is intended to cover all devices that have network capabilities and can receive and transmit data, and execute instructions that are either stored locally or received over the network, such as from an application server or another device.

Accessory devices, such as wristbands and other wearable computing devices may also be present in the environment 100. Such accessory devices are typically adapted, but not limited to interoperate with a coupled device 110 using a short range communication protocol like Bluetooth® to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110 or the network directly. Some accessory devices can be configured to work on a standalone basis (i.e., without relying on a coupled device 110 for functionality such as Internet connectivity) as wearable computing devices that may support an operating system and applications. Accessory devices may further include other electronic devices which provide additional features and functionality to the communication-inactive devices 110, such as webcam, speakers, and headphones 135.

Figure 2:
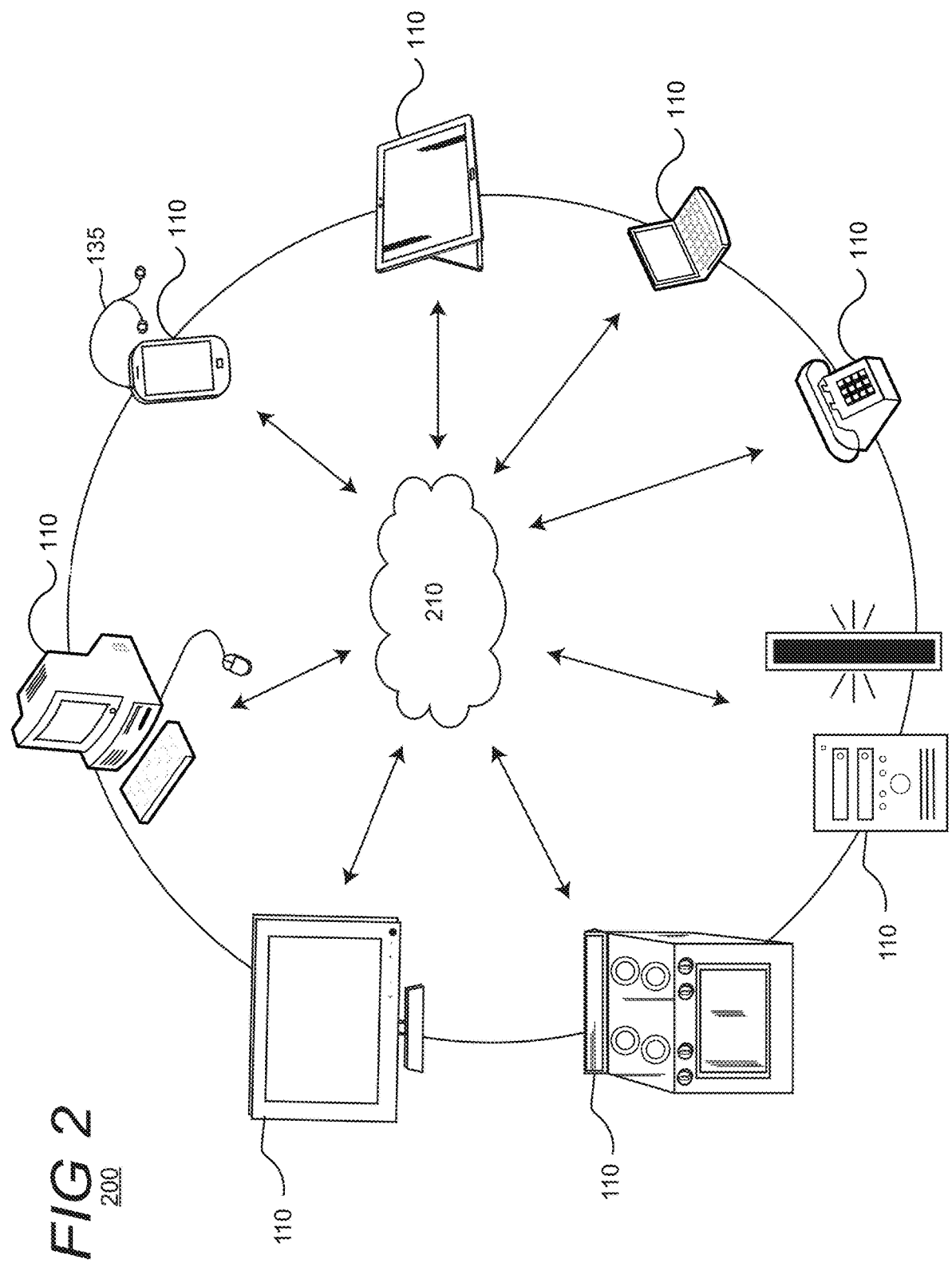
FIG. 2 shows an illustrative environment in which a plurality of devices may be directly or indirectly interconnected over a network.

FIG. 2 shows an illustrative diagram 200 of the various devices 110 interconnected with each other over a network 210. For example, each device 110 is configured with network-connectivity capabilities such that each device can connect with application servers, receive data, and transmit data. Moreover, Internet of Things (IoT) devices such as the oven and stereo system can be connected to the Internet as well, in addition to other devices such as smart appliances and home automation devices. The connectivity of these devices allows the various devices to receive data about other devices, and react accordingly.

Figure 3:
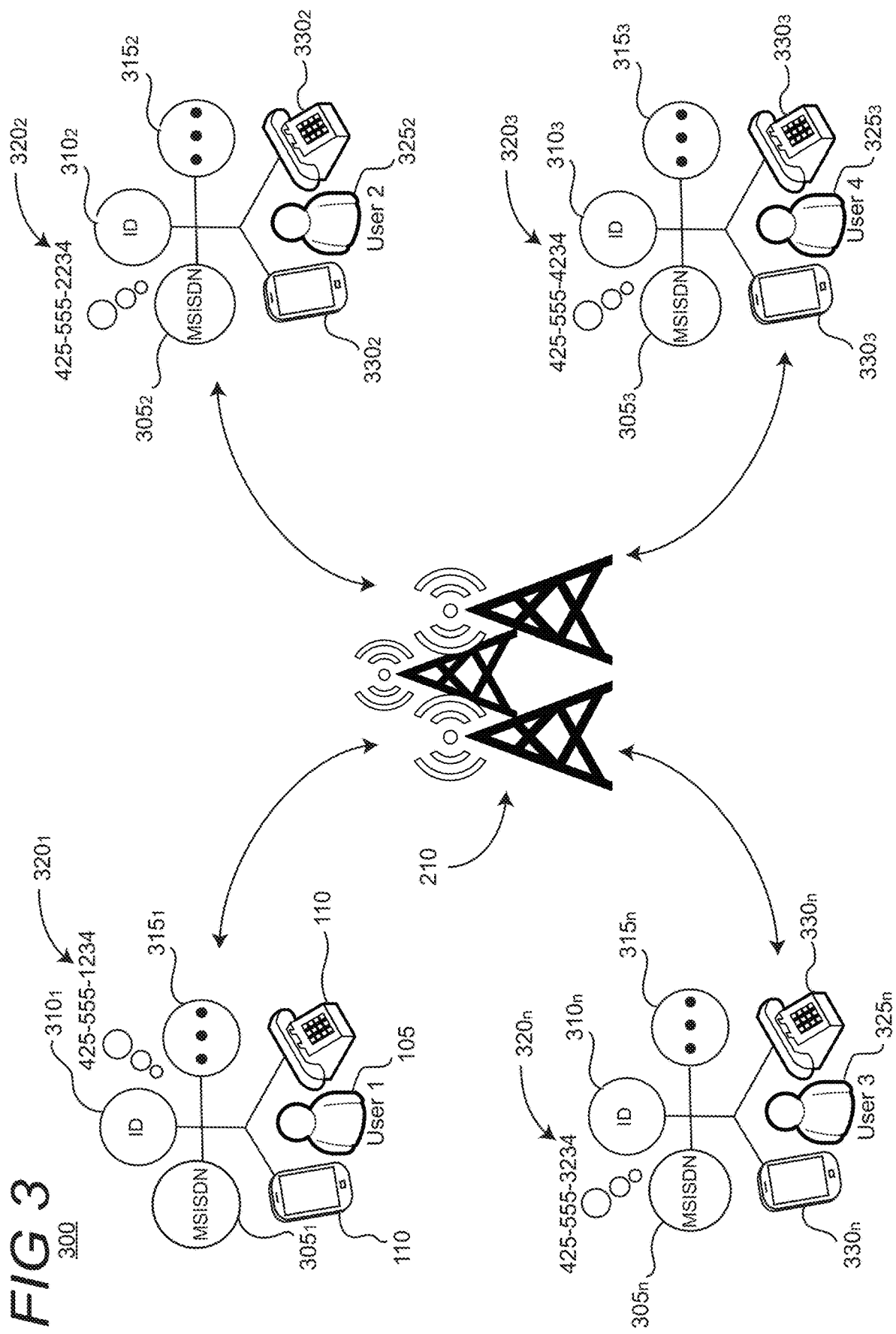
FIG. 3 shows an illustrative architecture in which various users are each associated with a unique identifier and are each able to communicate with other devices over the network.

FIG. 3 shows an illustrative architecture 300 of particular users and their devices 330, each associated with particular identification numbers. For example, users can be provided with an MSISDN (Mobile Station International Subscriber Directory Number) 305, Mobile Operator Account Identification (ID) 310, or other unique identifier 315. For example, each user's MSISDN may be defined by an E.164 numbering plan pursuant to the Telecommunications Standardization Sector, which includes a country code (e.g., 1 for the United States), and a National Destination Code (optional). These unique identifiers allow an audio and/or video call (individually or collectively a "call") to be routed to a particular device associated with a particular user over the network 210. As shown in FIG. 3 and by way of example only, the network 210 is a cellular network. One example of an MSISDN based in the United States is portrayed by numeral designation 320, which illustrates each respective user 105 and 325 associated with a unique identifier.

In addition to the MSISDN embodiment, other identifiers may be utilized to identify particular devices associated with a user as depicted by numeral 315 in FIG. 3, using other types of communication or messaging platforms. For example, for VoIP systems a Session Initiation Protocol (SIP) can use a Uniform Resource Locator (URL) as a unique identifier (e.g., sip:foo@operator.com). In addition, other calling and messaging platforms can use Globally Unique Identifiers (GUID) as a form of unique identification, which may be a 128-bit number that uniquely identifies a communication session or device. Other technologies to uniquely identify users and their respective devices may also be used.

Figure 4:
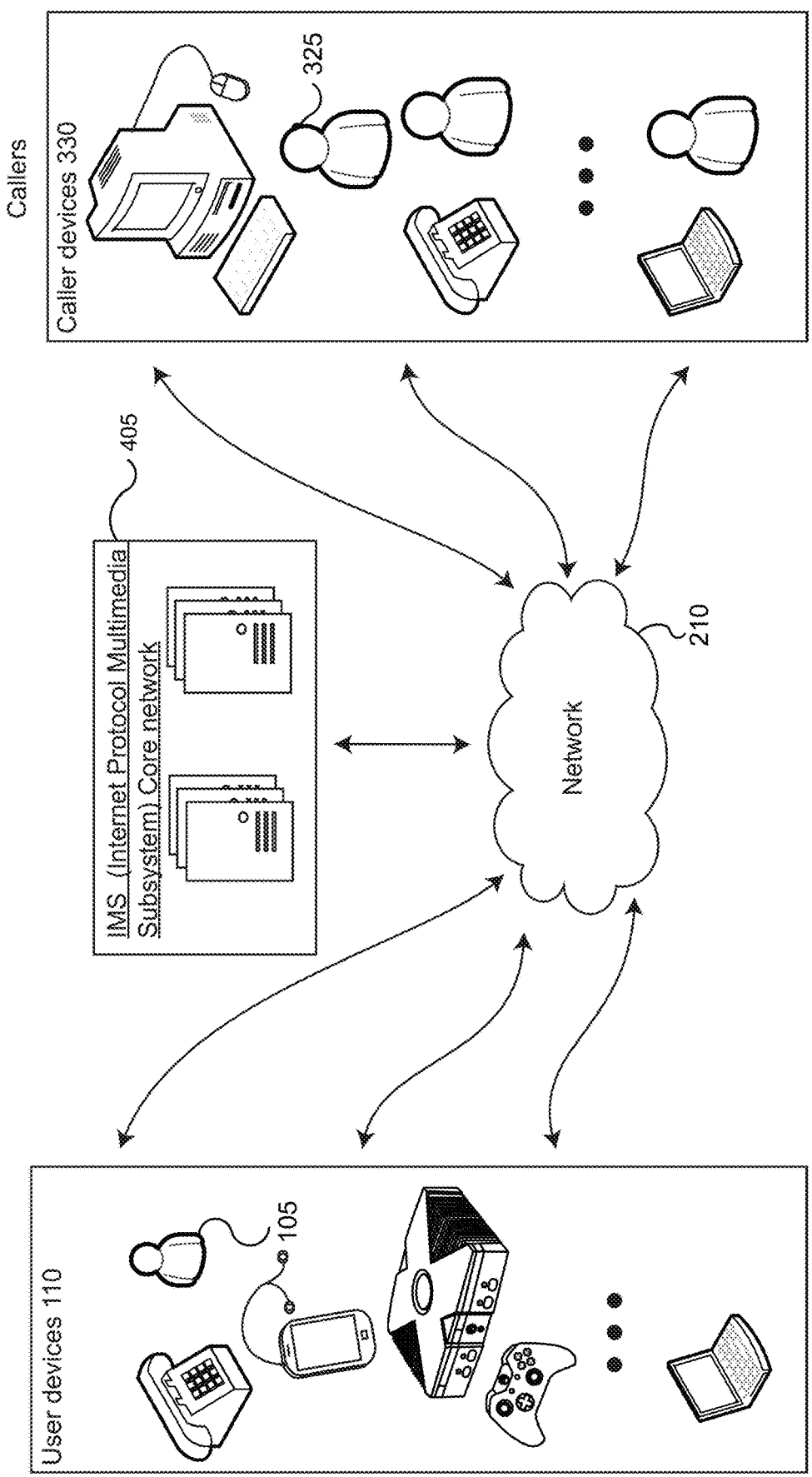
FIG. 4 shows an illustrative architecture of the user and a caller communicating over an Internet Protocol Multimedia Subsystem (IMS) core network.

FIG. 4 shows communication architecture 400 between devices 110 and caller devices 330 over network 210 and IMS core network 405. As depicted in FIG. 4, each user and his or her respective device connects with the IMS core network 405 over network 210, and the IMS core network 405 registers each device and establishes a connection between the two or more devices.

Figure 5:
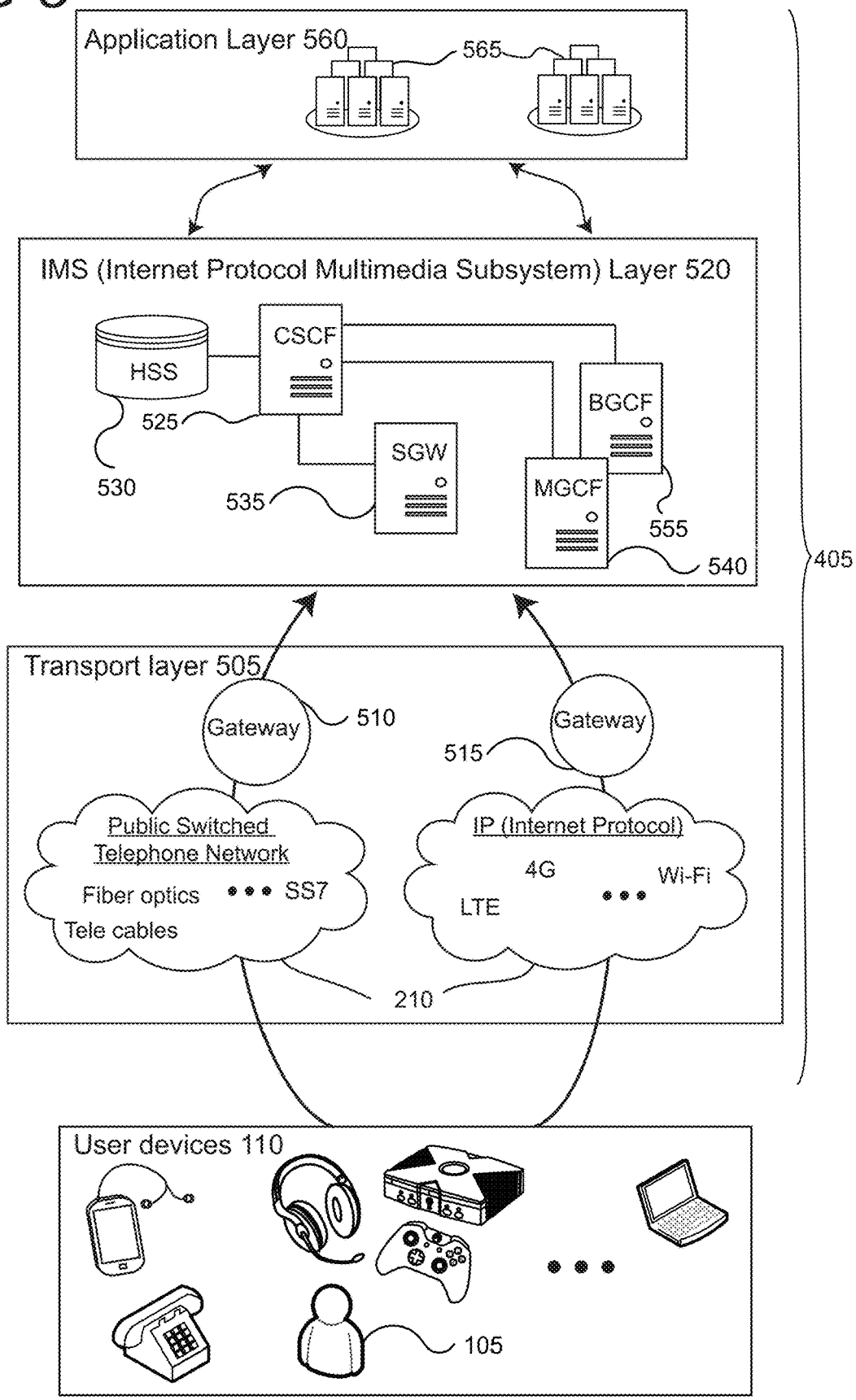
FIG. 5 shows the IMS core network of FIG. 4 in greater detail.

FIG. 5 shows details of the illustrative IMS core network 405 of FIG. 4 in greater detail to highlight the functionality of certain elements. For example, the IMS core network 405 provides a system architecture to support and provide the interoperability for various types of connections and devices when users establish a communication, such as a voice call or video call, over network 210. For example and as depicted in FIG. 5, the architecture of the IMS core network 405 includes at least three layers: a transport layer 505, an IMS Layer 520, and an application layer 560. The IMS core network 405 may include any number of environments in which communications are routed, such as PSTN (Public Switched Telephone Network) and IP (Internet Protocol) topographies. More specifically and by way of example only, the various devices 110 may establish communications from the transport layer 505 via PSTN (e.g., using fiber optics, telephone cables, and suitable signaling protocols such as Signaling System No. 7), and additionally the various devices 110 may establish communications from the transport layer 505 via an IP network, whether presently employed (e.g., LTE, 4G, and Wi-Fi) or upcoming networks (e.g., 5G standards and beyond).

These various types of communications may interact with the IMS Layer 520, which provides support for the interoperability of each topography of communication that is initiated or utilized by the respective devices 110. The IMS layer 520 is responsible for regulating communication flows (in this description, the term IMS core network refers to infrastructure supporting IMS functionality in general). The main functional elements of the IMS layer 520 include a Call Session Control Function (CSCF) 525 that is configured for controlling sessions between devices and applications. A Home Subscriber Server (HSS) 530 is a database maintaining user profile information which is used to authenticate and authorize network subscribers. A Signaling Gateway (SGW) 535 and Media Gateway Control Function (MGCF) 540 provide interoperability with a Circuit Switched network using a gateway 510 to the transport layer 505. A Breakout Gateway Control Function (BGCF) 555 may be implemented to select which network a breakout of a PSTN connection can occur, and establish the connection with the MGCF 540. The transport layer 505 further supports the IP network and respective gateway 515.

The transport layer 505 is the network-access layer that enables devices 110 to connect to the IMS core network 520 and establish IP connectivity. Once a device 110 has an IP address and can exchange SIP (Session Initiation Protocol) messages, it becomes capable of interacting with an IMS core network 405, independent of the underlying network-access technology.

The application layer 560 supports various application servers 565. While application servers 565 can be included as part of infrastructure in the IMS core network 405, application servers may additionally or alternatively be separate and thereby remote therefrom. Application servers 565 are typically configured as an IMS network element to provide services to an end user (e.g. users 105 and 325 in FIGS. 3 and 4) and thus may provide the business logic in an IMS core network 405. Such services may include, for example, conference bridging, text to speech, billing, interactive voice response, and the like. The application servers 565 communicate with the IMS core network using SIP.

The CSCF 525 can play three discrete roles: Serving-CSCF (S-CSCF), Interrogating-CSCF (I-CSCF), or Proxy-CSCF (P-CSCF), which each use SIP signaling. An S-CSCF exposes a registrar that receives registration information from respective devices that are associated with a user when the devices register with the IMS core network for IMS services using suitable SIP messages. More than one of the user's devices can be registered at the same time, and devices can maintain registration with the network or discontinue registration at any time. For example, the user may associate a common phone number with one or more of his devices so that an incoming call from the calling party (FIG. 4) can ring on each one of the devices that is currently registered with the IMS core network.

FIG. 6 shows an illustrative architecture 600 in which device 110 transmits real-time data 605 to device state service 630, and the service forwards the real-time data 605 to one or more of the user's devices 110. The device 110 may be configured with a device state application 635 (stored locally on the device 110), which is responsible for identifying and transmitting the real-time data 605 to the service. The real-time data 605 includes, for example, device state data 610, sensor data 615, context data 620, and can include other forms of data 625 as well. As illustrated in FIG. 6, the device 110 includes a connection signal 640 which graphically illustrates that the device state of the device is currently communication-active (e.g., in-progress call, ringing, busy signal). When the user is engaged in an active communication, the device state data 610 that describes the state and type of active communication may be transmitted over network 210 to the device state service 630.

The device 110 may transmit the real-time data 605 as soon as a particular device becomes engaged in an active communication or call, or additionally or alternatively the device 110 may periodically update the service according to some parameter. For example, the device may transmit the real-time data to the service after a pre-determined threshold of time elapses (e.g., every 10 minutes). Nonetheless, the device may transmit the real-time data as soon as the communication becomes active so that the service can timely and effectively transmit such real-time data to the user's communication-inactive devices 110. The IMS core network 405 in FIG. 6 is depicted as an alternative or additional embodiment. That is, the transmission of the real-time data may be directed through the IMS core network or be directed only over the network (e.g., the Internet).

FIGS. 7-9 provide illustrative classifications 700 that are included as device state data, context data, and sensor data. For example, the classifications 700 for device state data as depicted in FIG. 7 include incoming or outgoing ringing 705, incoming or outgoing busy signal 710, in-progress audio and/or video call 715, checking or leaving a voicemail 720, or engaging in a messaging session 725 (e.g., transmitting, typing, or receiving text or multimedia messages). The items provided in FIG. 7 may indicate that a device is currently communication-active, whether the activity is an in-progress call, a busy signal, ringing, or an active messaging session (e.g., transmitting or receiving messages).

FIG. 8 provides illustrative classifications 800 for context data, such as location of communication-active and communication-inactive devices 805; current actions of communication-active and/or communication-inactive devices (e.g., sound playing, downloading content) 810; device capabilities including battery level 815; device capabilities including performance of hardware such as microphone, webcam, and processor(s) 820; the call information (e.g., contact data of other party—such as friend, colleague, police—and duration of communication/call) 825; and identified (e.g., by a digital assistant) key words in conversation 830.

FIG. 9 provides illustrative classifications 900 for sensor data, such as inferred activity of the user (e.g., using accelerometer, heart rate monitor) 905, inferred stress or anxiety level of the user (e.g., using heart rate monitor) 910, and location data (e.g., using GPS) 915.

The various items portrayed in FIGS. 7-9 may be utilized by the device state service 630. As illustrated in environment 1000 of FIG. 10A, when the device state service 630 receives the real-time data 605 from the device 110, the service can provide a series of functions. For example, the service can, among other things, forward device state, context, and sensor data to communication-inactive devices (e.g., inactive devices associated with the user) 1005, determine actions for communication-inactive and/or communication-active devices 1010, and identify device capabilities (e.g., processor performance, display resolution) 1015. The device capabilities may be transmitted and updated based on a pre-determined time parameter, and/or may be transmitted as soon as one device is communication-active (e.g., call in-progress, ringing, busy signal). From here and as graphically depicted by arrow 1020, the service may forward the requisite signals or instructions to one or more communication-inactive devices 110.

Figure 10A:
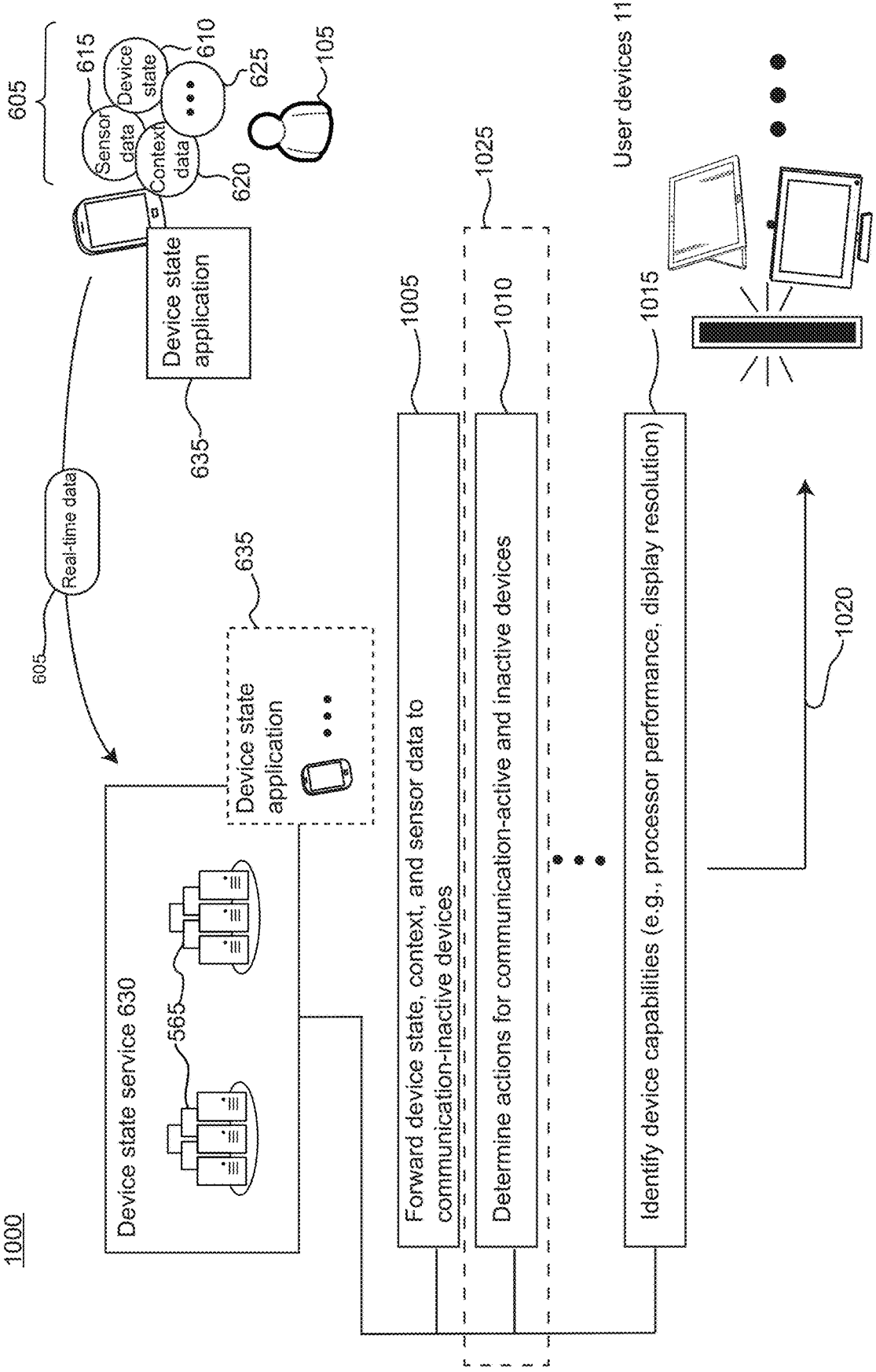
FIG. 10A shows exemplary functions performed by the device state service supported by an application server and/or a device state application.

As illustrated in FIG. 10A, cut-out portion 1025 is depicted in FIG. 10B, which provides a series of actions that may be determined to be performed by a device. For example, the determined actions can include switch communication-inactive device on or off (e.g., Internet-enabled oven) 1030, adjust settings of a communication-inactive device (e.g., increase/decrease volume, play/pause movie, lock/unlock door) 1035, hand off audio and/or video call from communication-active device to communication-inactive device 1040, interoperate components of communication-active and communication-inactive devices 1045, enter a power-save mode 1050, and perform system and/or application updates 1055.

Furthermore, some of the services depicted in FIG. 10B may be executed by the device state application 635 on the devices 110. If each respective device state application 635 determines the action to be performed, then the device state service 630 may receive and forward the real-time data from a communication-active device to the communication-inactive devices so that the communication-inactive devices can properly determine an action. Therefore, in addition to the device state application being configured to identify and transmit real-time data to the service, the device state application can also be adapted to perform particular functions as well upon receipt of the real-time data from the service or communication-active device.

FIGS. 11-21 show illustrative scenarios in which the device state service 630 and device state application 635 operate with the user 105. In each example, when the device state of a device 110 is active (FIG. 7), the communication-active device 110 transmits the device state data, along with the context data and sensor data (FIGS. 8-9), to the device state service 630. The service may then determine an action to be performed by the applicable communication-active devices, and transmit the determined action accordingly. The service may alternatively forward the real-time data from the communication-active device to the communication-inactive devices, and the device state applications on the communication-inactive devices can independently and locally determine and execute an action to perform.

The various embodiments described with respect to at least FIGS. 11-21 include descriptions of particular computing devices. Unless specifically stated, the computing devices (e.g., communication-active and communication-inactive devices) are not constrained to a particular scenario, but rather can include any computing device. Thus, discussion of a tablet computer, smartphone, PC, laptop, and the like, can be replaced with other types of computing devices. For example, the example with respect to FIG. 11 illustrates a tablet computer, but may also be performed by a PC. The example with respect to FIGS. 15A-B illustrates a tablet computer and a PC, but can alternatively be implemented on a smartphone and a multimedia console.

Furthermore, the various embodiments described with respect to at least FIGS. 11-21 include descriptions of various audio and video calls. Unless specifically stated, the various embodiments may likewise execute in a text or multimedia communication session in addition to audio or video calls. For example, the tablet computer in FIG. 11 may perform the described operations in the event the user is engaged in a messaging session (e.g., transmitting and receiving a threshold number of messages). The remainder of embodiments described may likewise function despite the communication session, including audio or video call, text messaging session, or any combination thereof.

FIG. 11 shows one illustrative embodiment 1100 in which the user 105 is engaged in an active call on his smartphone 110, as graphically illustrated by signal 1105. The call can be any one of the device states listed in FIG. 7. In response to the present activity of the smartphone, the user's tablet computer, currently held in the user's hand, executes some exemplary functions.

In exemplary scenario 1110, the tablet computer enters a power save mode. In the power save mode the screen brightness may reduce and all types of device state calls can be disabled because the tablet computer knows that the user is already on an active call on his smartphone. In addition, the display of the tablet in this scenario can include a window to exit the power save mode. If the user chooses to exit the power save mode, then the device may revert back to pre-power save mode settings. This may occur, for example, if the user decides to use the tablet computer while he is still on the active call.

In exemplary scenario 1115, the tablet computer 110 may execute additional or pending actions now that the tablet computer knows that the user is preoccupied on an active call. For example, the tablet computer may execute any pending scheduled updates, such as system updates, application updates, etc. This allows the most efficient use of resources since the tablet computer knows it does not need to reserve resources to monitor for incoming calls, and knows the user is busy on the call. In addition, if the user decides to use the tablet computer while still on the call, the user has the option to exit update mode, which may revert the tablet back to prescheduled update settings. Specifically and as shown in FIG. 11, the tablet computer includes a window that provides the user with an option to exit update mode.

FIG. 12 shows an illustrative block diagram 1200 of the scenarios in FIG. 11. At block 1205 the smartphone is communication-active. At block 1210 the smartphone (communication-active device) transmits its device state, context, and sensor data to the device state service 630. Additionally, at block 1215 the tablet (communication-inactive device) can transmit its respective device state, context, and sensor data to the device state service 630 as well. Depending on the situation, the service may decide to utilize the data from the communication-inactive device as well. At blocks 1220 and 1225, the service receives the device state, context, and sensor data from the smartphone and the tablet. At block 1230, the service determines an action for the tablet computer. In this scenario, the action is to enter a power save mode and/or a scheduled update mode. At block 1235, the service transmits the determined action to the tablet computer. And at block 1240 the tablet computer enters power save mode and/or scheduled update mode, as depicted in FIG. 11.

Figure 13A:
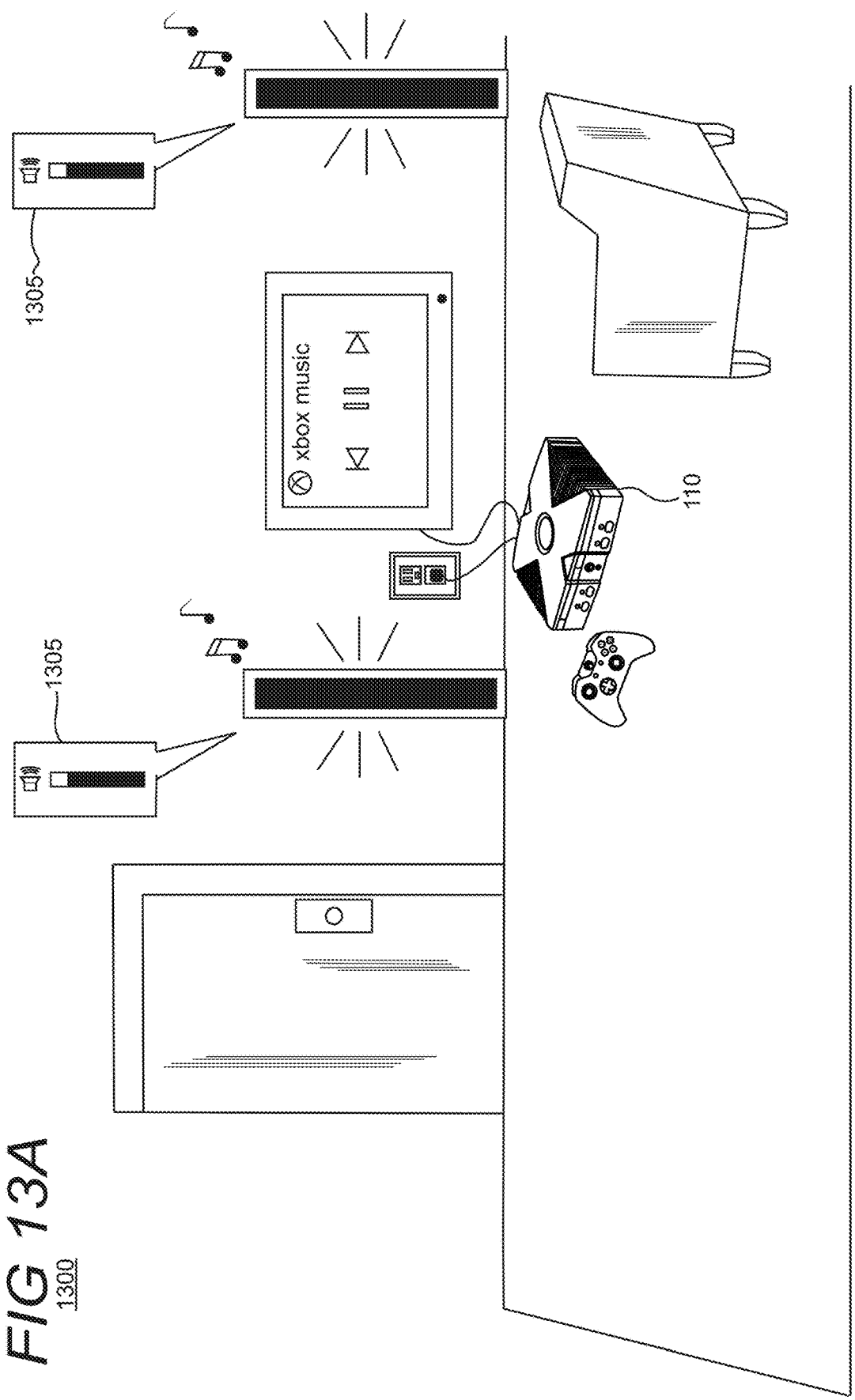
FIG. 13A shows a room with sound playing on a multimedia system.

FIG. 13A shows another illustrative embodiment 1300 in which a stereo device 110 alters its settings based on an indication that one of the user's devices 110 is communication-active. For example, in FIG. 13A the speakers and stereo system are at a relatively high volume, as depicted by volume graphics 1305. However, in this embodiment 1300, the room is currently empty. In the subsequent stage, shown in embodiment 1350 of FIG. 13B, the user 105 has entered the room and is on an active call using his smartphone 110, as depicted by active signal 1355. In response, the stereo system intelligently lowers its volume so that the user is able to seamlessly continue the conversation. For example, the user does not need to place the other party on hold to lower the volume. In addition, the user does not need to have the conversation interrupted by the noise from the stereo system.

FIG. 14 shows an illustrative block diagram 1400 of the scenario depicted in FIGS. 13A-B. At block 1405 the smartphone is communication-active. At block 1410 the smartphone (communication-active device) transmits its device state, context, and sensor data to the device state service 630. Additionally, at block 1415 the internet-enabled stereo system (communication-inactive device) can transmit its respective device state, context, and sensor data to the device state service 630. Depending on the situation, the service may decide to utilize the data from the communication-inactive device as well. At blocks 1420 and 1425, the service receives the device state, context, and sensor data from the smartphone and the stereo system.

At block 1430, the device state service 630 determines an action for the stereo system. The device state service 630 may utilize the location of both the smartphone and stereo system to make a determination. For example, when the user enters the room where the stereo system is (or is within a pre-determined distance threshold from the stereo system), the service monitors the user's actions and determines to lower the volume of the stereo system. Alternatively, the stereo system may completely switch itself or the speakers off. Furthermore, the pre-determined distance threshold between the stereo system and smartphone may change according to the identified volume level of the stereo system. For example, a loud volume level may result in an increased pre-determined distance threshold, whereas a relatively lower volume level may result in a decreased pre-determined distance threshold.

At block 1435, the device state service 630 transmits the determined action to the stereo system. And at block 1440 the stereo system lowers its volume, as illustrated in FIG. 13B, or alternatively can be completely switched off.

Figure 15A:
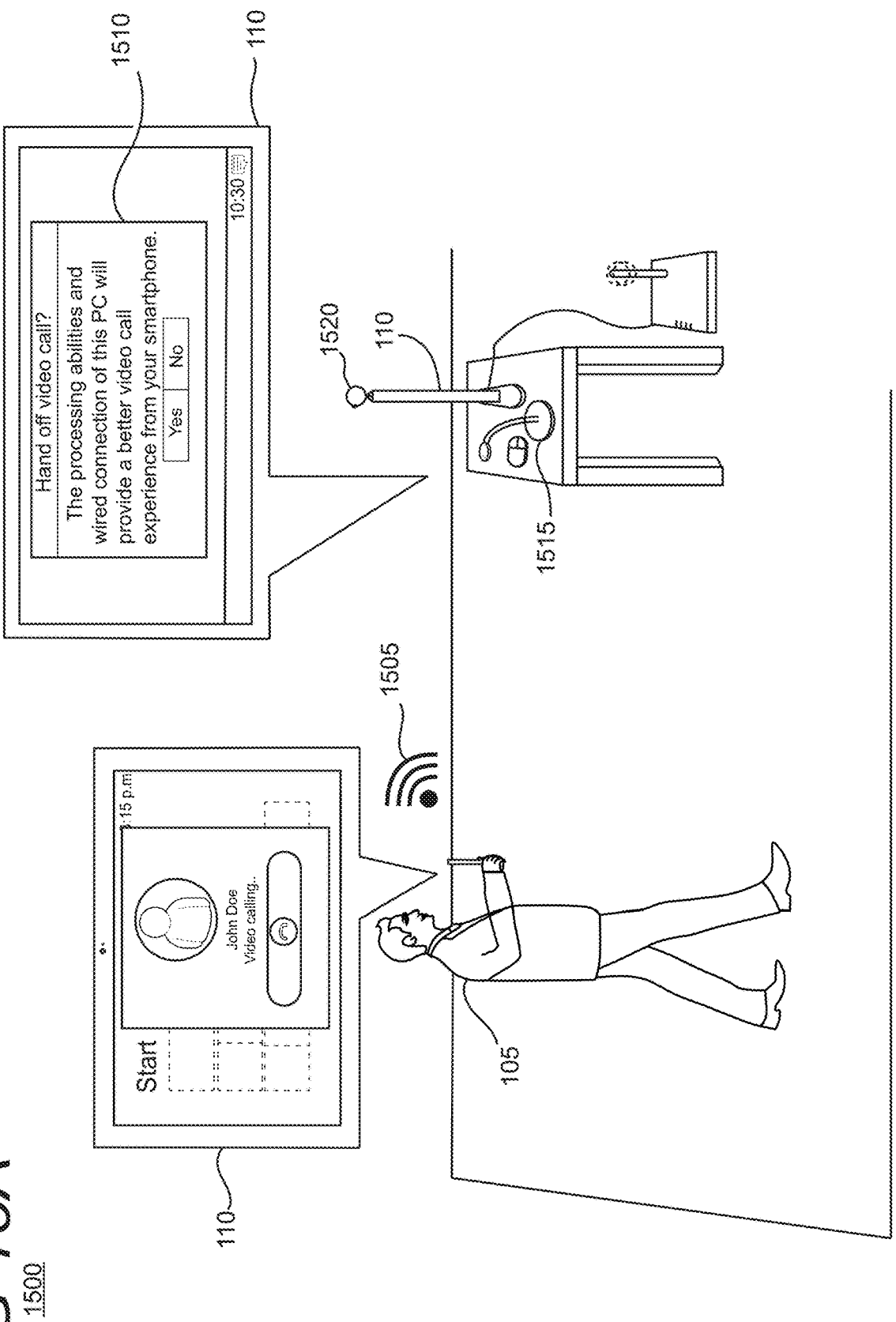
FIG. 15A shows the user video calling John Doe with his tablet and shows a window from a PC (personal computer) that provides an option to hand off the call.

FIG. 15A shows another illustrative embodiment 1500 in which a PC (Personal Computer) alters its settings based on an active video call on the tablet computer. For example, in the embodiment 1500 the user video calls John Doe, which thereby makes the tablet computer communication-active as depicted by signal 1505. In this scenario, the PC is equipped with better processing abilities (e.g., CPU and/or GPU) than the tablet computer. In addition, the PC uses a physical wire (e.g., Ethernet cable) to connect to the Internet, which is generally more reliable than a Wi-Fi connection.

Due to these facts, the user's PC displays a window 1510 with an option to hand off the video call to the PC. In the subsequent embodiment 1550 of FIG. 15B, the user's tablet computer also displays a window with the same message as the PC, in which the user selects the "yes" option to hand off the video call to the PC. The user's tablet computer disables the microphone and webcam and disconnects from the video call 1555. In addition, the PC enables a microphone 1515 and webcam 1520 for the video call 1560.

FIG. 16 shows an illustrative block diagram 1600 of the scenario depicted in FIGS. 15A-B. At block 1605 the tablet computer is communication-active because of the outgoing video call ringing. At block 1610 the tablet computer (communication-active device) transmits its device state, context, and sensor data to the device state service 630. Additionally, at block 1615 the PC (communication-inactive device) can transmit its respective device state, context, and sensor data to the service. Depending on the situation, the service may decide to utilize the data from the communication-inactive device as well. At blocks 1620 and 1625, the device state service 630 receives the device state, context, and sensor data from the tablet and PC.

At block 1630, the device state service 630 determines an action for the PC. The service may utilize the location of both the tablet computer and PC to make the determination. For example, since the user was within a pre-determined threshold distance to the PC when the video call was initiated on the tablet computer, the service is able to intelligently monitor the user's actions and determine that the PC is an appropriate and valid option for the video call as well. Furthermore, the service compared the device capabilities of the PC with that of the tablet computer, which resulted in the determination that the PC may provide a more improved user experience for the video call.

At block 1635, the device state service 630 transmits the determined action to both the tablet computer and PC. At blocks 1640 and 1645 the tablet computer and PC, respectively, provide a window to the user to hand off the video call to the PC. At block 1655, upon consent from the user, the tablet computer disables its microphone and webcam and disconnects from the video call. Finally, at block 1660 the microphone and webcam are enabled on the PC, and the PC connects to the video call. Here, the PC (communication-inactive device) may connect to the video call prior to the disconnect of the tablet computer (communication-active device) so that the call is not inadvertently disconnected.

FIGS. 17A-B show additional illustrative embodiments in which a PC performs an action based on an active video call on the tablet computer. For example, in the embodiment 1700 portrayed in FIG. 17A, the user 105 video calls John Doe as graphically depicted by signal 1705. The initiation of the video call makes the tablet computer communication-active. When the tablet computer becomes communication-active, the user's PC displays a window 1710 with an option to interoperate the video call between the PC and the tablet computer. Specifically and as shown by window 1710, the performance of the webcam 1715 on the PC is better than the front-facing camera on the tablet computer. However, the PC in this example is not equipped with a microphone. Thus, the window 1710 provides an option for the user to employ the webcam 1715 of the PC, while still utilizing the microphone of the tablet computer to maximize the user's video call experience.

In the subsequent embodiment 1750 of FIG. 17B, the tablet computer also displays a window 1755 with the same message as the PC. The user subsequently selects the "yes" option to interoperate the components of the tablet computer and the PC. In response, the tablet's webcam is disabled 1760 and the PC enables its webcam and connects to the video call 1765.

Figure 18:
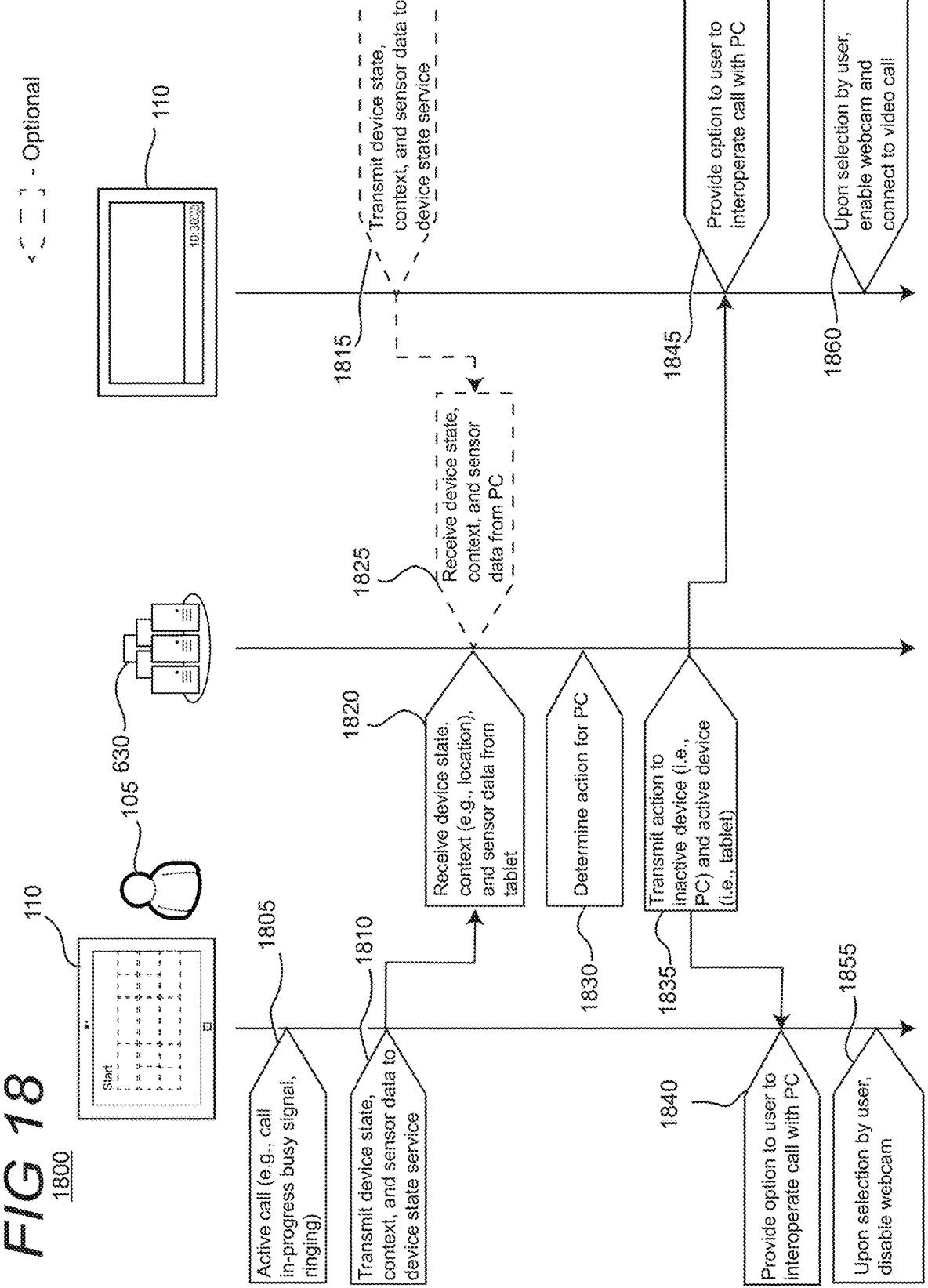
FIG. 18 shows illustrative processes performed by the tablet, device state service, and PC of FIGS. 17A-B.

FIG. 18 shows an illustrative block diagram 1800 of the scenario depicted in FIGS. 17A-B. At block 1805 the tablet is communication-active due to the outgoing video call ringing. At block 1810 the tablet computer (communication-active device) transmits its device state, context, and sensor data to the device state service 630. Additionally, at block 1815 the PC (communication-inactive device) can also transmit its respective device state, context, and sensor data to the device state service 630. Depending on the situation, the service may decide to utilize the data from the communication-inactive device as well. At blocks 1820 and 1825, the service receives the device state, context, and sensor data from the tablet computer and PC.

At block 1830, the service determines an action for the PC. In this scenario the service utilizes the location of both the tablet computer and PC to make a determination. For example, since the user was within a pre-determined threshold distance to the PC when the video call was initiated on the tablet computer, the service intelligently monitored the user's actions and determined that the PC is an appropriate and valid option for the video call as well. Furthermore, the service compared the device capabilities of the user's PC and tablet computer and determined that the PC may provide a better user experience with the improved webcam.

At block 1835, the device state service 630 transmits the determined action to both the tablet computer and PC. At blocks 1840 and 1845 the tablet computer and PC, respectively, provide a window to the user to interoperate the video call between the tablet computer and PC. At block 1855, upon selection from the user, the tablet computer disables its webcam. Finally, at block 1860 the PC's webcam is enabled, and the PC connects to the video call. The PC (communication-inactive device) may connect to the video call and enable the webcam prior to disabling the tablet's (communication-active device) webcam. This may provide a more seamless user experience, and also reduce the possibility of inadvertently disconnecting from the call.

Figure 19:
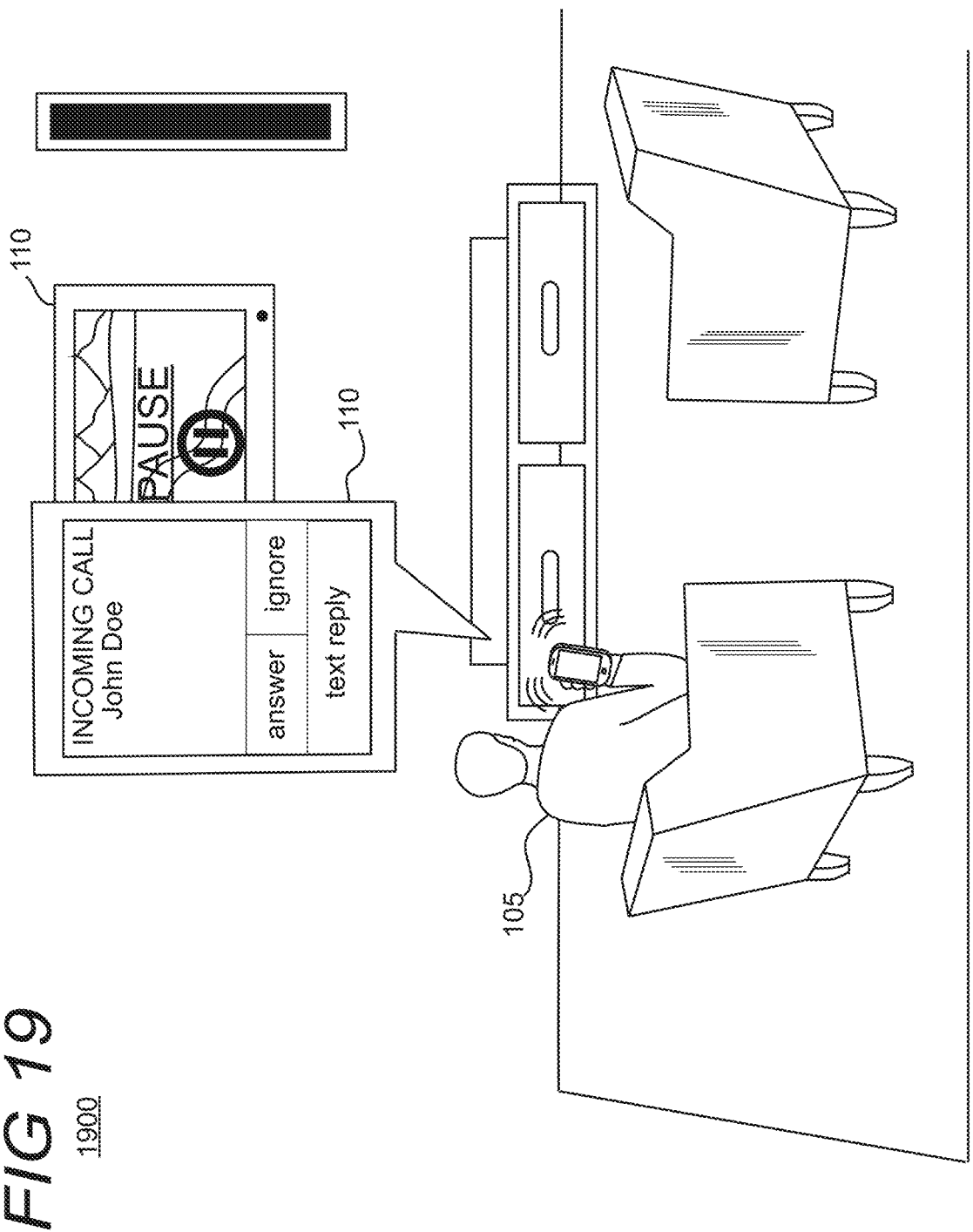
FIG. 19 shows the response of a smart television in response to an incoming call on the smartphone.

FIG. 19 shows another illustrative embodiment 1900 in which a television device 110 alters its settings based on an indication that one of the user's devices is active. For example, in FIG. 19 the user's smartphone receives an incoming call from John Doe (e.g., the phone is ringing). The incoming call makes the smartphone communication-active at the device state service 630. In response, the user's television pauses the movie or show that the user was previously watching so that the user can answer the call. Thus, the interconnection between the television and the smartphone allows for a more seamless, convenient, and overall improved user experience with his devices. This improved user experience is obtained with little to no user interaction necessary, and thereby with less interruption. Although an incoming call is depicted in FIG. 19, this is one example in which a received text message can have the same effect, that is, cause the television to pause the movie or show.

Figure 20:
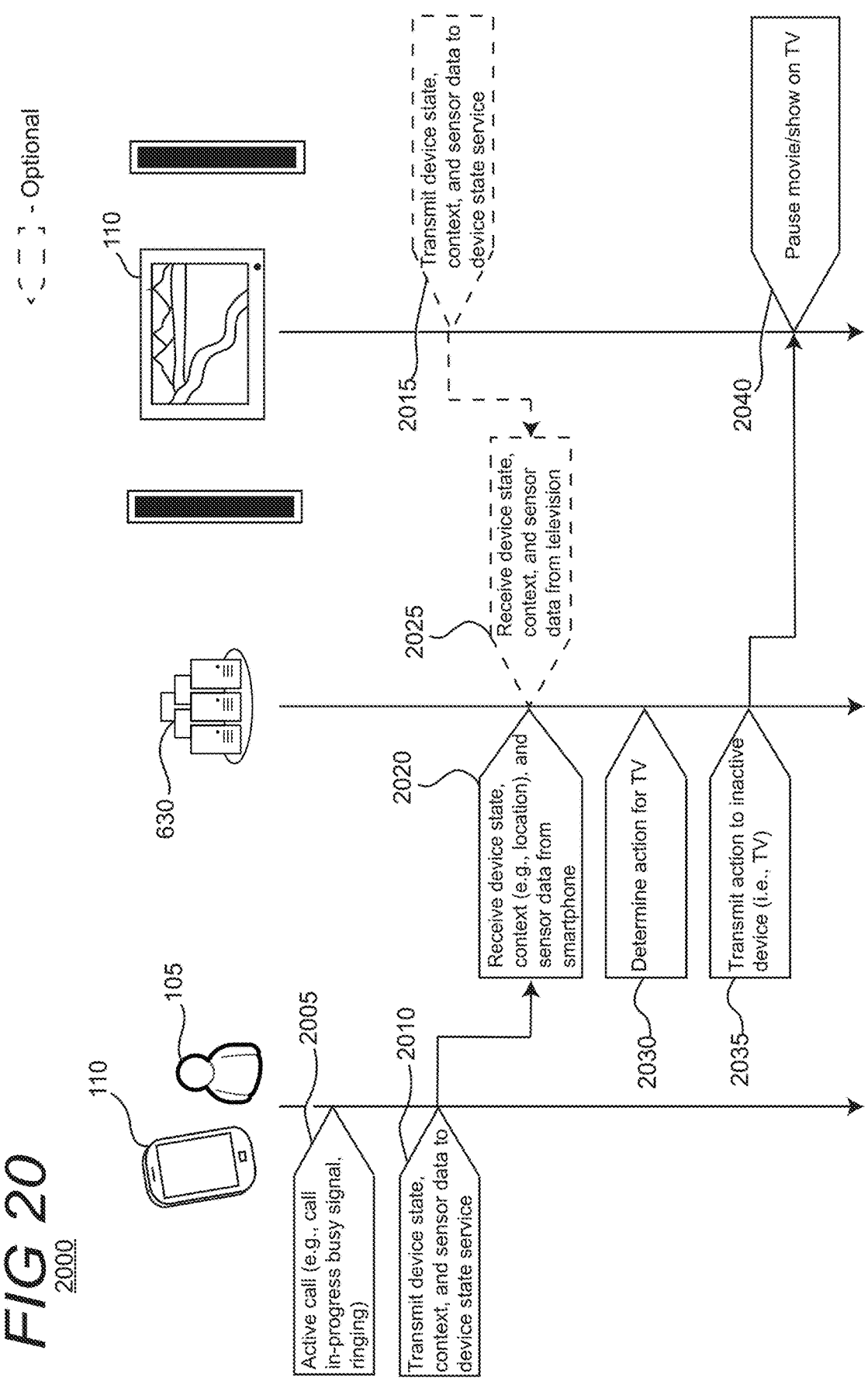
FIG. 20 shows illustrative processes performed by the smartphone, device state service, and television of FIG. 19.

FIG. 20 shows an illustrative block diagram 2000 of the scenario depicted in FIG. 19. At block 2005 the smartphone is communication-active because of the incoming call. At block 2010 the smartphone (communication-active device) transmits its device state, context, and sensor data to the device state service 630. Additionally, at block 2015 the internet-enabled smart television (communication-inactive device) can transmit its respective device state, context, and sensor data to the device state service 630. Depending on the situation, the service may decide to utilize the data from the communication-inactive device as well. At blocks 2020 and 2025, the service receives the device state, context, and sensor data from the smartphone and the smart television.

At block 2030, the device state service 630 determines an action for the television. In this scenario the service utilizes the location of both the smartphone and smart television to make a determination. For example, using the location data of both the smartphone and smart television, the device state service 630 determines that both devices are within a threshold proximate distance from each other. Although the television may not have a location component, the service can identify location by other methods, such as the Wi-Fi or Internet service associated with the television. Furthermore, because the service monitors the actions of the television (communication-inactive device), the service knows that the television is currently in use (e.g., playing a movie or show). Subsequently, when the smartphone became active, the service determines that the movie or show should be paused.

At block 2035, the service transmits the determined action to the smart television. And at block 2040 the television pauses the movie/show, as illustrated in FIG. 19.

Figure 21:
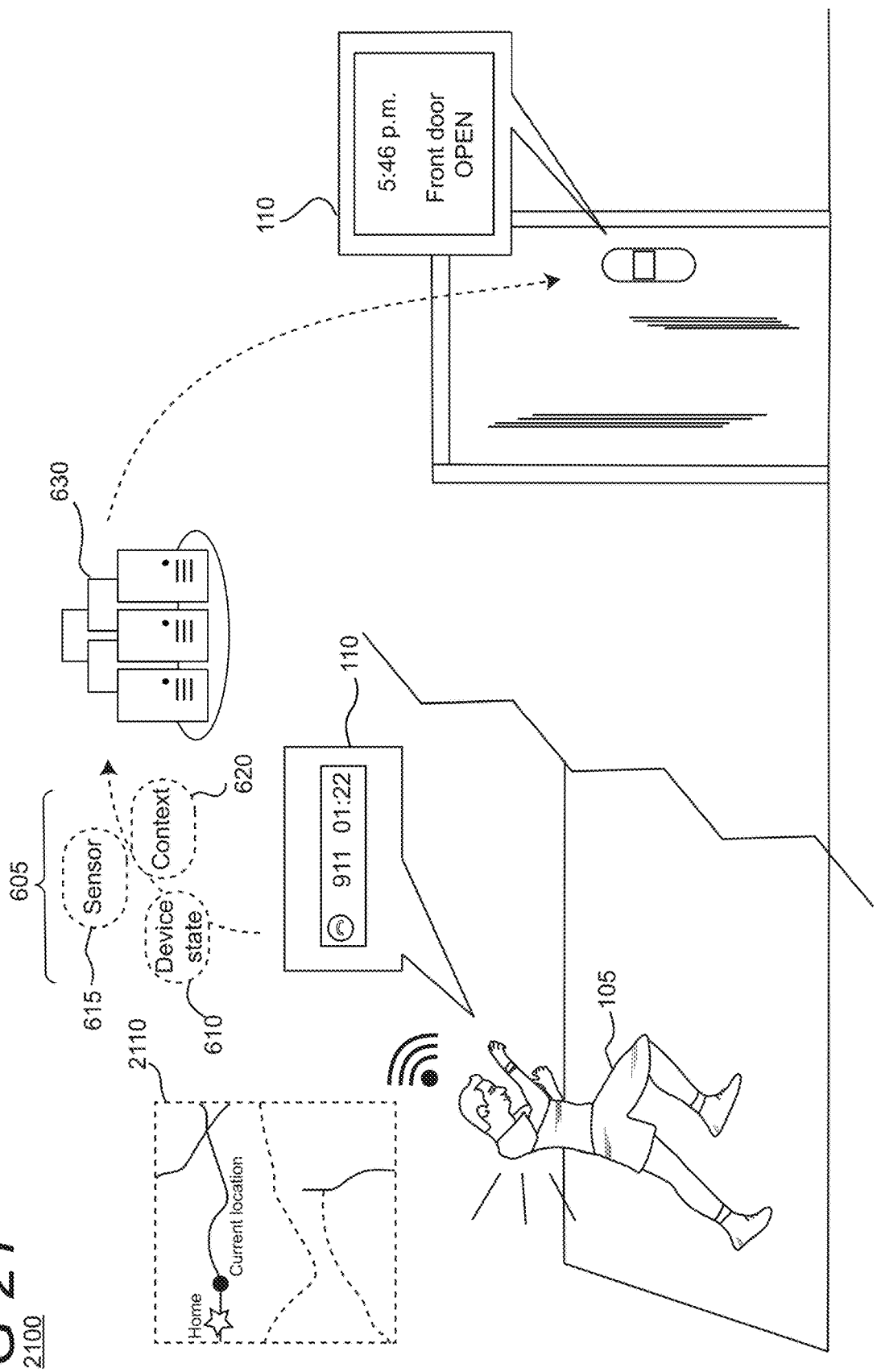
FIG. 21 shows a smart door lock unlock itself in response to a user's active call on his wearable band.

FIG. 21 shows another illustrative embodiment 2100 in which a smart door lock ("smartlock") 110 connected to the network 210 (FIG. 2) adjusts its settings. For example, in FIG. 21 the user's wearable watch is connected with 911 emergency while the user is sprinting home. As depicted in the map 2110, the user's location, obtained from the wearable band, is near home. In response, the user's smartlock unlocks the door once the user is within a threshold proximate distance to the user's home and/or smartlock. Specifically, the service knows that the user is connected with 911 (context data) and may have an emergency. In addition, the service knows that the user is sprinting (sensor data) and that the user is heading in the direction of home (context data). Thus, to provide the user with a seamless experience across devices, the service instructs the smartlock to open in anticipation of the user arriving.

Figure 22:
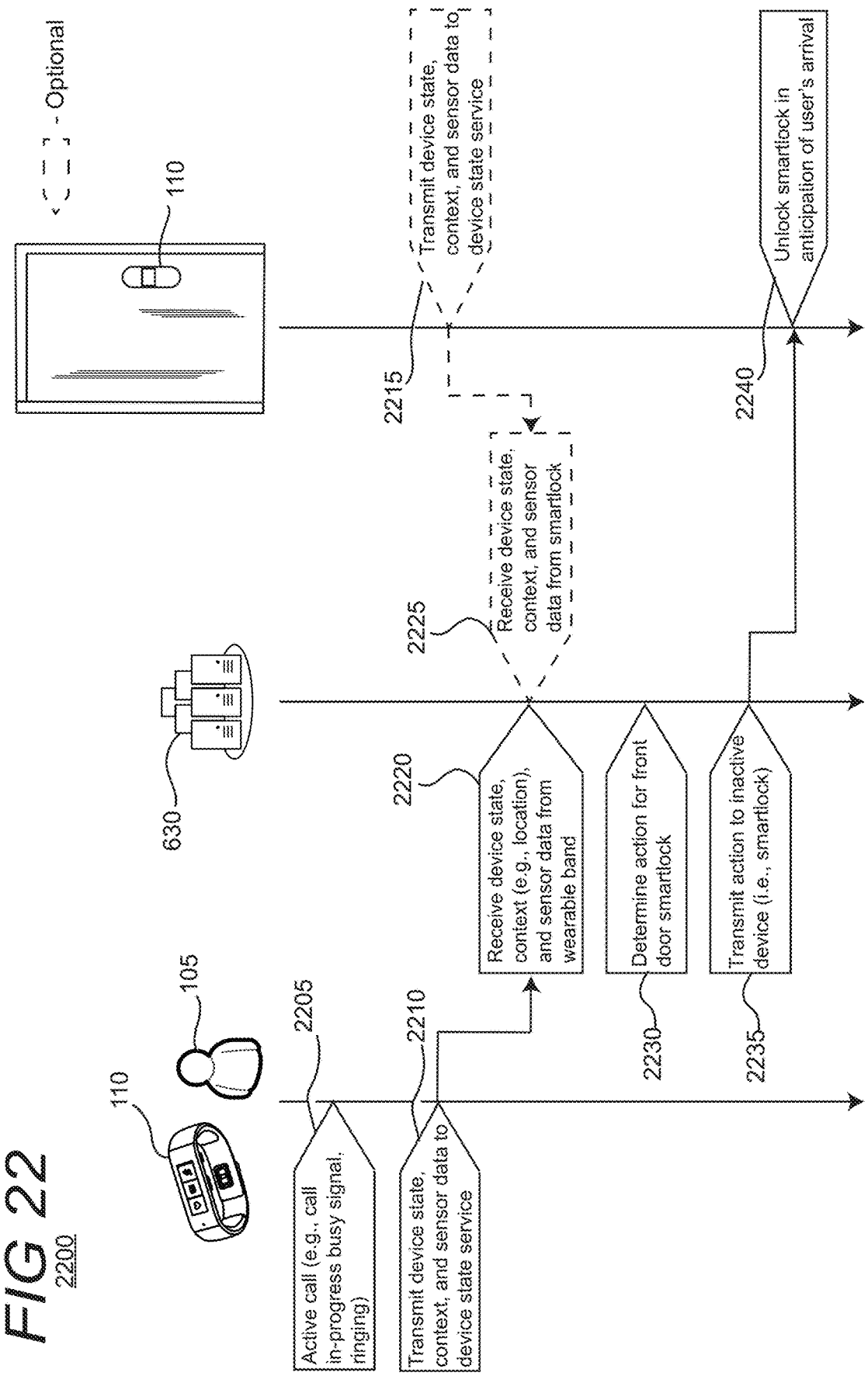
FIG. 22 shows illustrative processes performed by the wearable band, device state service, and smart door lock of FIG. 21.

FIG. 22 shows an illustrative block diagram 2200 of the scenario depicted in FIG. 21. At block 2205 the wearable band is active because of the in-progress call. At block 2210 the wearable band (communication-active device) transmits its device state, context, and sensor data to the device state service 630. Additionally, at block 2215 the internet-enabled smartlock (communication-inactive device) can transmit its respective device state, context, and sensor data to the service. Depending on the situation, the service may decide to utilize the data from the communication-inactive device as well. At blocks 2220 and 2225, the service receives the device state, context, and sensor data from the wearable band and the door's smartlock.

At block 2230 the device state service 630 determines an action for the door's smartlock. In this scenario the service utilizes the context data (e.g., 911 contact data, user heading in direction of home) and sensor data (e.g., sprinting and high-stress or anxiety) in order to determine the action to unlock the front door in anticipation of the user's arrival. At block 2235, the device state service 630 transmits the determined action to the smartlock. And at block 2240, the smartlock unlocks the door in anticipation of the user's arrival.

Figure 23:
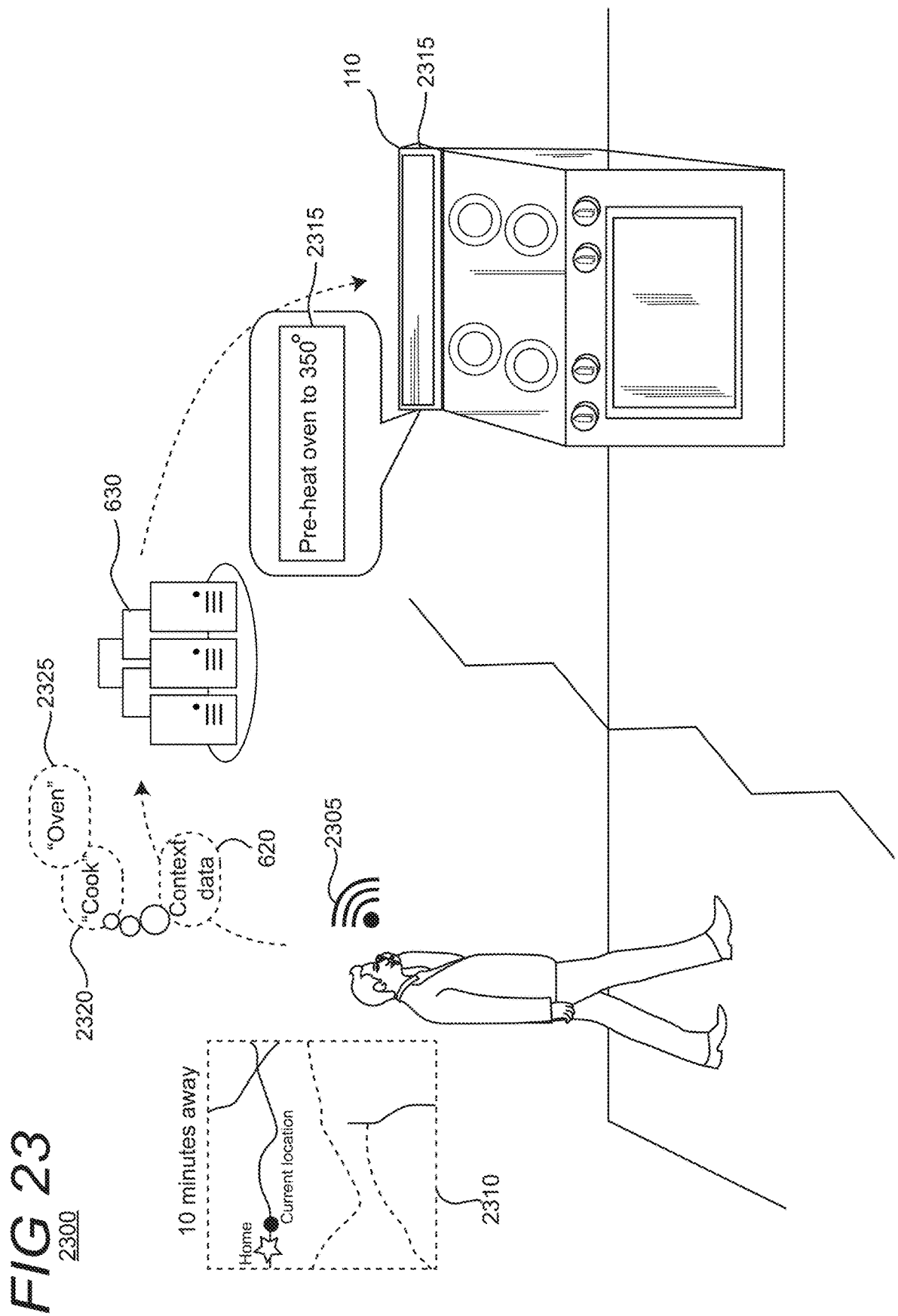
FIG. 23 shows a smart oven pre-heat in response to a user's active call on his smartphone.

FIG. 23 shows another illustrative embodiment 2300 in which a smart oven 110 connected to the network 210 (FIG. 2) adjusts its settings. For example, in FIG. 23 the user 105 is engaged in a phone call on his smartphone as graphically illustrated by signal 2305. In this scenario the service may identify in the context data that the user is 10 minutes from home, as depicted on map 2310. Furthermore, using the context data, such as digital assistant capabilities, the service identifies key words spoken by the user such as "cook" 2320 and "oven" 2325. The digital assistant capabilities may be a module stored locally or remotely and the digital assistant communicates with the device state application, and thereby monitors user communications with the user's consent. In response to the various context data, the user's smart oven pre-heats to 350°, as shown on display 2315, so the user can cook as soon as he arrives home.

Figure 24:
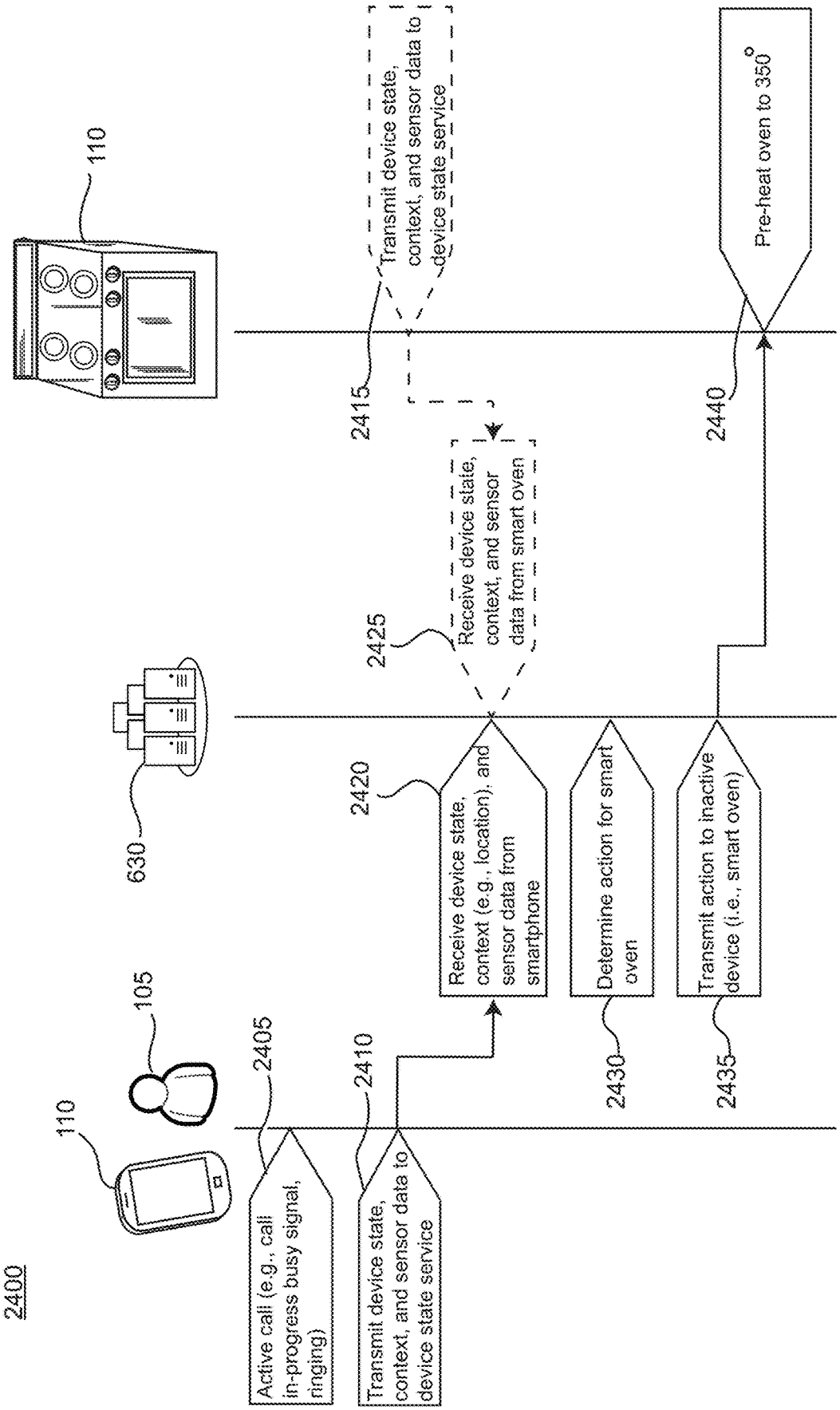
FIG. 24 shows illustrative processes performed by the smartphone, device state service, and wearable band of FIG. 23.

FIG. 24 shows an illustrative block diagram 2400 of the scenario depicted in FIG. 23. At block 2405 the smartphone is active because of the in-progress call. At block 2410 the smartphone (communication-active device) transmits its device state, context, and sensor data to the device state service 630. Additionally, at block 2415 the internet-enabled smart oven (communication-inactive device) can transmit its respective device state, context, and sensor data to the device state service 630. The service may decide to utilize the data from the communication-inactive device as well. At blocks 2420 and 2425, the service receives the device state, context, and sensor data from the smartphone and the smart oven.

At block 2430, the device state service 630 determines an action for the smart oven. In this scenario the service utilizes the context data (e.g., identified key words "oven" and "cook" and the user's distance from home), in order to determine the action to pre-heat the oven to 350°. At block 2435, the device state service 630 transmits the determined action to the smart oven. And at block 2440, the smart oven pre-heats to 350 degrees F. in anticipation of the user's arrival.

Figure 25:
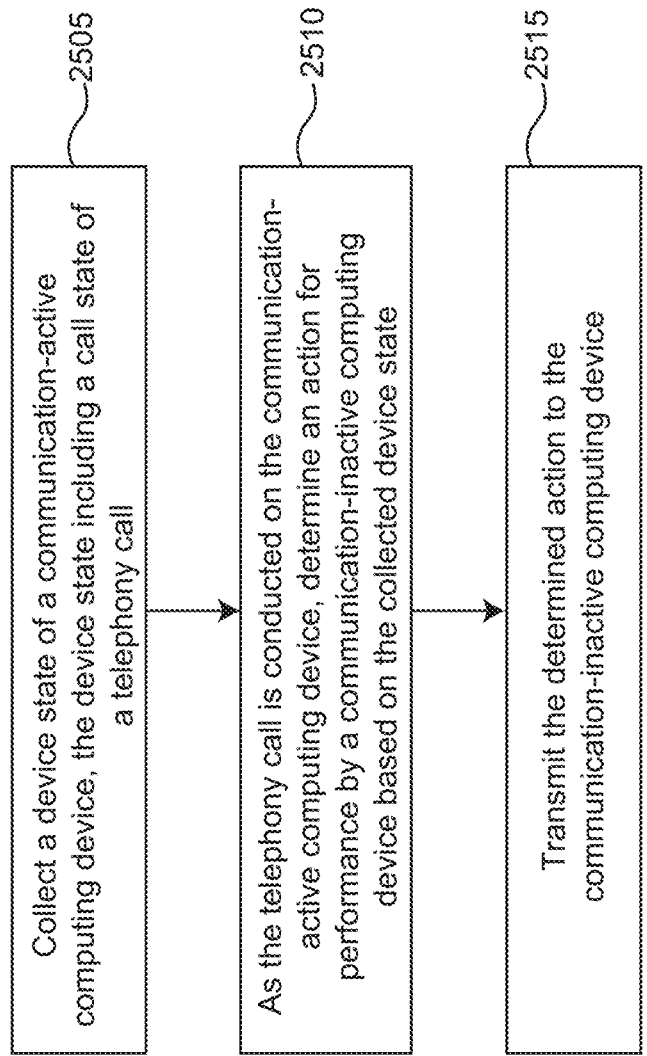
FIGS. 25-27 show illustrative methods performed by a device and/or a device state service.

FIG. 25 is a flowchart of an illustrative method 2500 that may be performed by a device state service or a computing device to determine an action for a communication-inactive computing device. In step 2505, a device state of a communication-active computing device is collected, the device state includes a call state of a telephony call. In step 2510, as the telephony call is conducted on the communication-active computing device, an action for performance by the communication-inactive computing device is determined based on the collected device state. In step 2515, the determined action is transmitted to the communication-inactive computing device.

Figure 26:
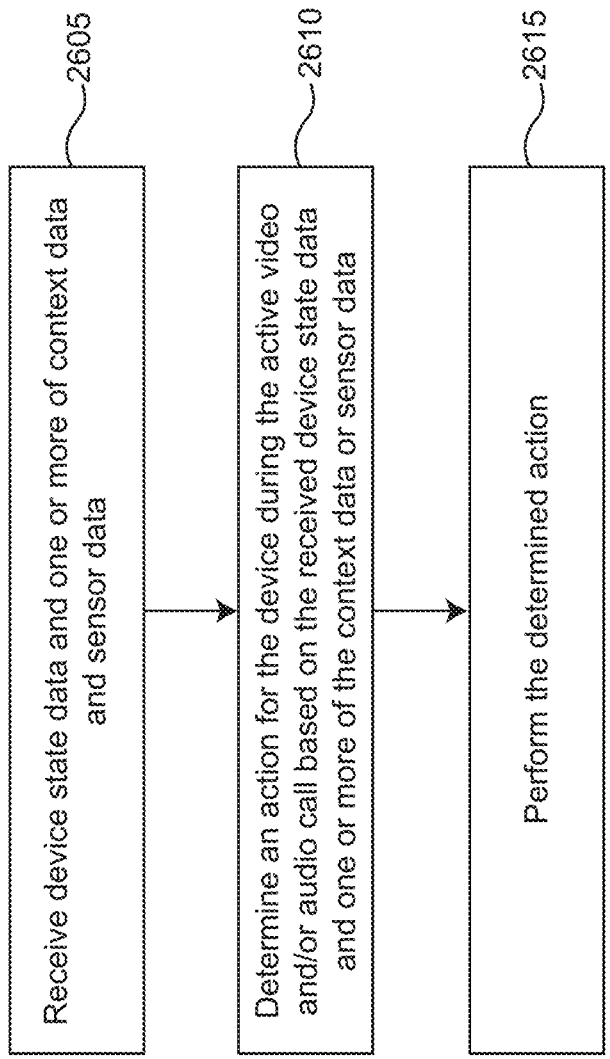

FIG. 26 is a flowchart of an illustrative method 2600 that may be performed by a device. In step 2605 device state data and one or more of context data and sensor data is received. The device state data can include a current status of an active video and/or audio call on an active device. In step 2610, an action for the device during the active video and/or audio call is determined. The action may be determined based on the received device state data and one or more of the context data or the sensor data. In step 2615, the determined action is performed.

Figure 27:
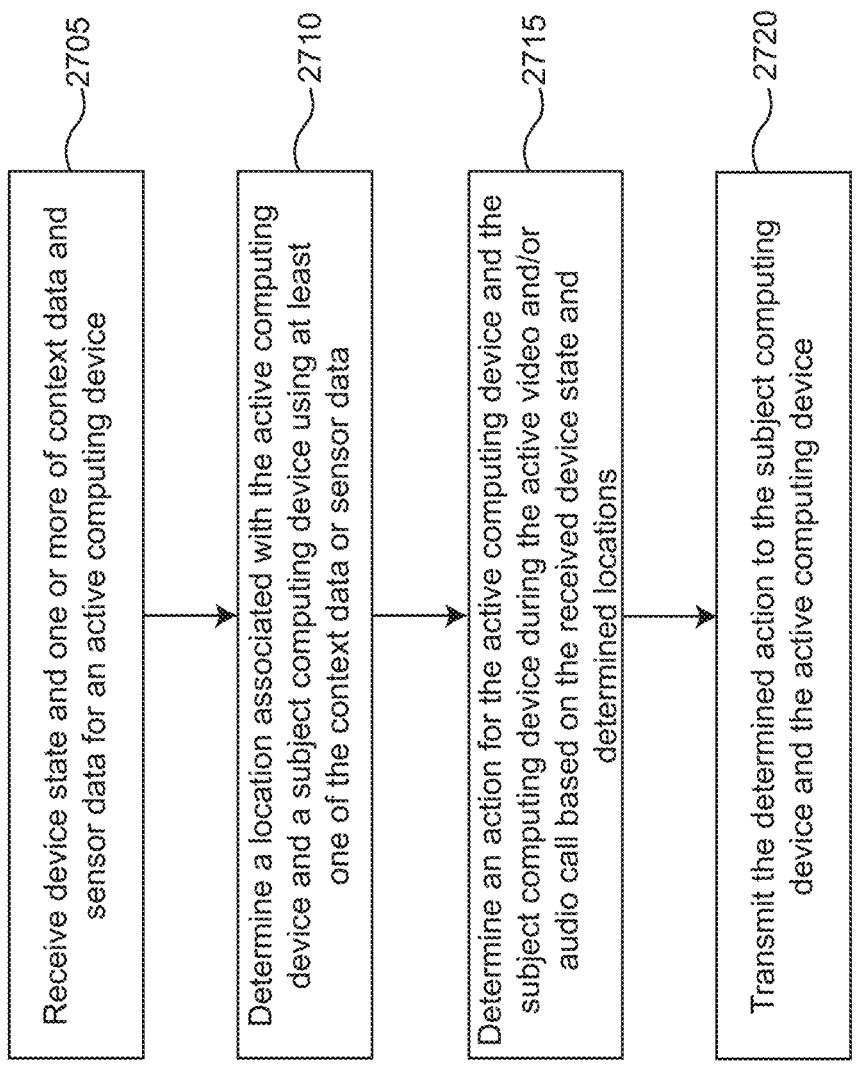

FIG. 27 is a flowchart of an illustrative method 2700 that may be performed by a computer server. In step 2705 device state and one or more of context data and sensor data for an active computing device is received. The device state data can include a current status of an active video and/or audio call between the active computing device and a calling party. In step 2710, a location is determined for the active computing device and a subject computing device using at least one of the context data or sensor data. In step 2715, an action is determined for the active computing device and the subject computing device during the active video and/or audio call. The determined action can be based on, for example, the received device state and the determined locations. In step 2720, the determined action is transmitted to the subject computing device and active computing device.

Figure 28:
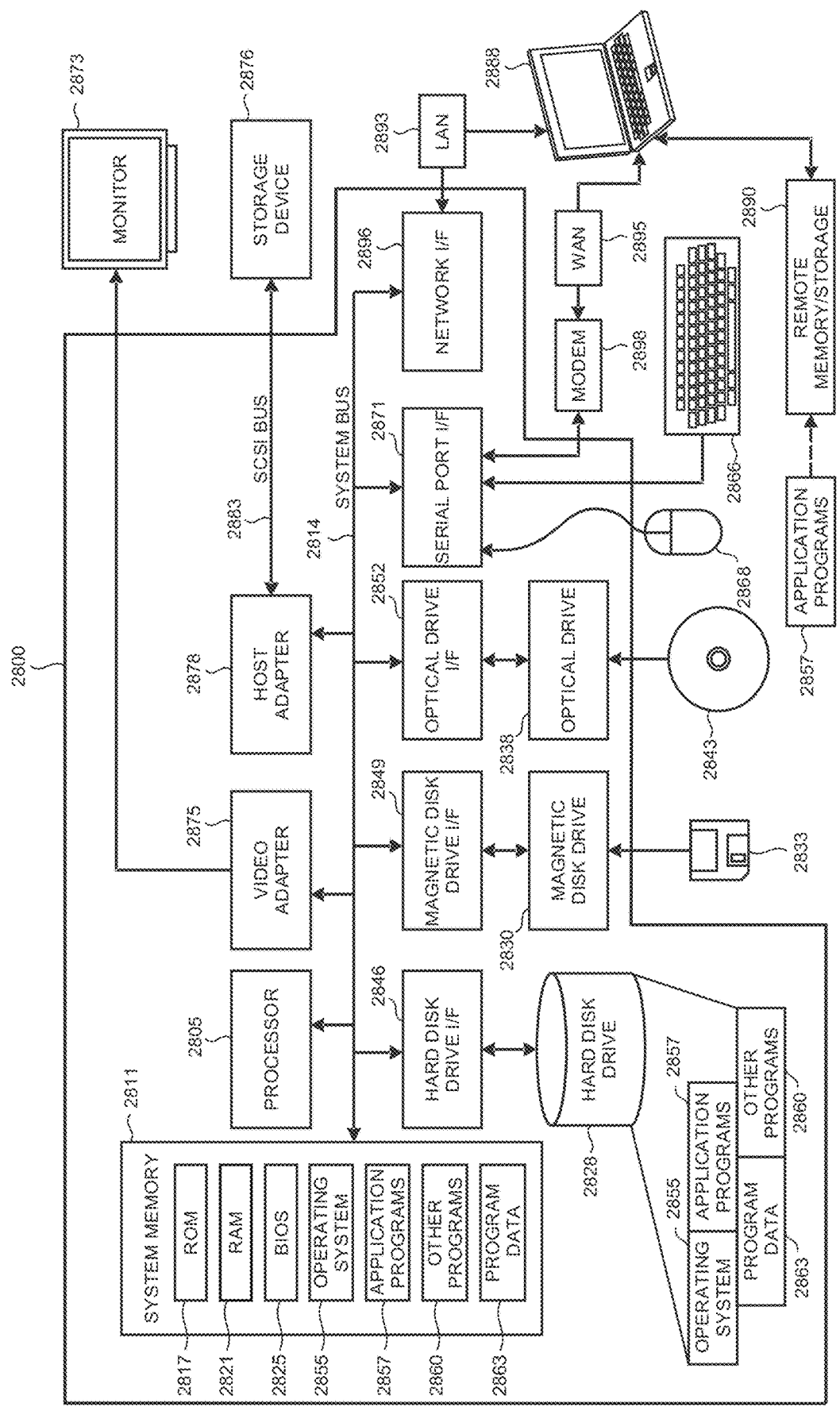
FIG. 28 is a simplified block diagram of an illustrative computer system such as a PC.

FIG. 28 is a simplified block diagram of an illustrative computer system 2800 such as a PC, client machine, or server with which the present notifications to all devices to update state service may be implemented. Computer system 2800 includes a processor 2805, a system memory 2811, and a system bus 2814 that couples various system components including the system memory 2811 to the processor 2805. The system bus 2814 may be any of several types of bus structures including a memory bus or memory controller, a peripheral bus, or a local bus using any of a variety of bus architectures. The system memory 2811 includes read only memory (ROM) 2817 and random access memory (RAM) 2821. A basic input/output system (BIOS) 2825, containing the basic routines that help to transfer information between elements within the computer system 2800, such as during startup, is stored in ROM 2817. The computer system 2800 may further include a hard disk drive 2828 for reading from and writing to an internally disposed hard disk (not shown), a magnetic disk drive 2830 for reading from or writing to a removable magnetic disk 2833 (e.g., a floppy disk), and an optical disk drive 2838 for reading from or writing to a removable optical disk 2843 such as a CD (compact disc), DVD (digital versatile disc), or other optical media. The hard disk drive 2828, magnetic disk drive 2830, and optical disk drive 2838 are connected to the system bus 2814 by a hard disk drive interface 2846, a magnetic disk drive interface 2849, and an optical drive interface 2852, respectively. The drives and their associated computer-readable storage media provide non-volatile storage of computer-readable instructions, data structures, program modules, and other data for the computer system 2800. Although this illustrative example includes a hard disk, a removable magnetic disk 2833, and a removable optical disk 2843, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present notifications to all devices to update device state. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk 2828, magnetic disk 2830, optical disk 2838, ROM 2817, or RAM 2821, including an operating system 2855, one or more application programs 2857, other program modules 2860, and program data 2863. A user may enter commands and information into the computer system 2800 through input devices such as a keyboard 2866 and pointing device 2868 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2805 through a serial port interface 2871 that is coupled to the system bus 2814, but may be connected by other interfaces, such as a parallel port, game port, or universal serial bus (USB). A monitor 2873 or other type of display device is also connected to the system bus 2814 via an interface, such as a video adapter 2875. In addition to the monitor 2873, personal computers typically include other peripheral output devices (not shown), such as speakers and printers. The illustrative example shown in FIG. 28 also includes a host adapter 2878, a Small Computer System Interface (SCSI) bus 2883, and an external storage device 2876 connected to the SCSI bus 2883.

The computer system 2800 is operable in a networked environment using logical connections to one or more remote computers, such as a remote computer 2888. The remote computer 2888 may be selected as another personal computer, a server, a router, a network PC, a peer device, or other common network node, and typically includes many or all of the elements described above relative to the computer system 2800, although only a single representative remote memory/storage device 2890 is shown in FIG. 28. The logical connections depicted in FIG. 28 include a local area network (LAN) 2893 and a wide area network (WAN) 2895. Such networking environments are often deployed, for example, in offices, enterprise-wide computer networks, intranets, and the Internet.

When used in a LAN networking environment, the computer system 2800 is connected to the local area network 2893 through a network interface or adapter 2896. When used in a WAN networking environment, the computer system 2800 typically includes a broadband modem 2898, network gateway, or other means for establishing communications over the wide area network 2895, such as the Internet. The broadband modem 2898, which may be internal or external, is connected to the system bus 2814 via a serial port interface 2871. In a networked environment, program modules related to the computer system 2800, or portions thereof, may be stored in the remote memory storage device 2890. It is noted that the network connections shown in FIG. 28 are illustrative and other means of establishing a communications link between the computers may be used depending on the specific requirements of an application of the present notifications to all devices to update state.

Figure 29:
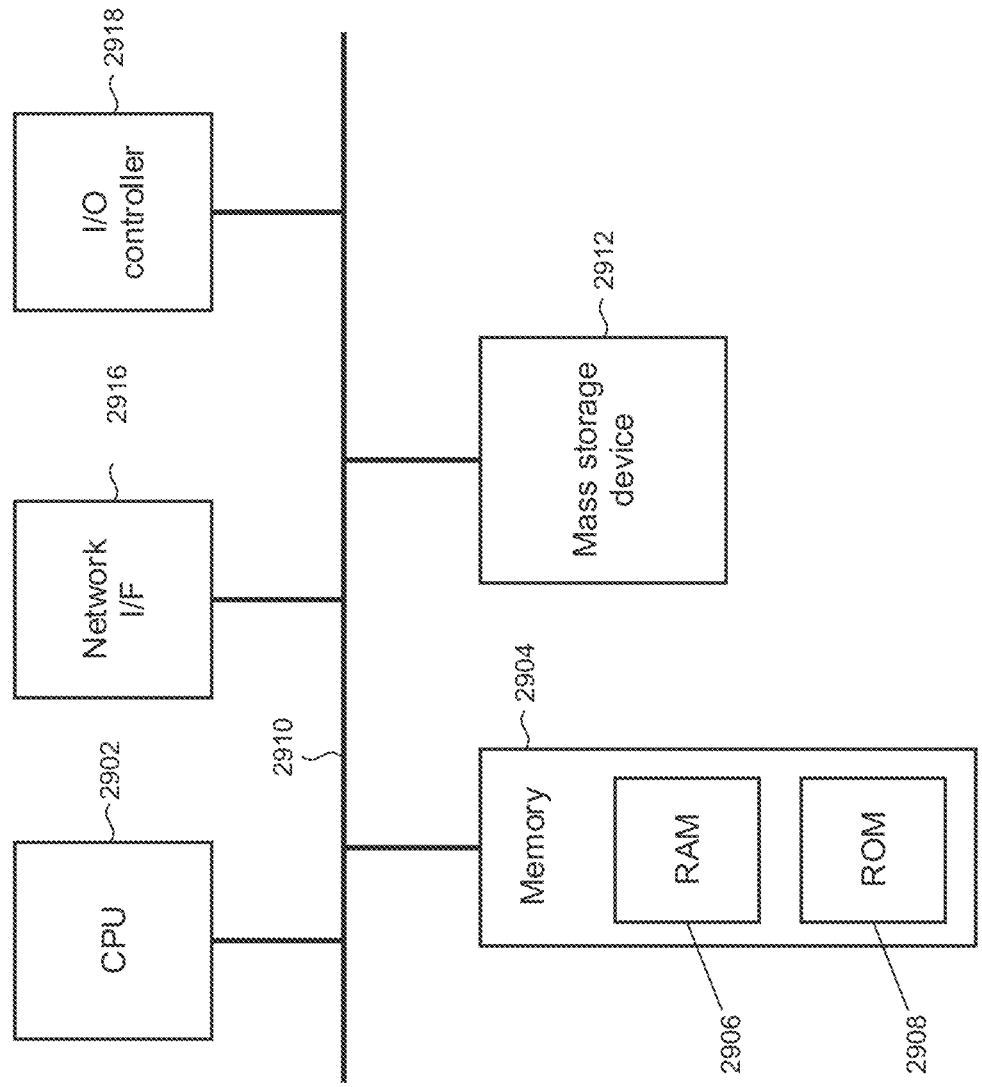
FIG. 29 shows a block diagram of an illustrative device that may be used in part to implement the present notifications to all devices to update state.

FIG. 29 shows an illustrative architecture 2900 for a device capable of executing the various components described herein for providing notifications to all devices to update state using notification service. Thus, the architecture 2900 illustrated in FIG. 29 shows an architecture that may be adapted for a server computer, mobile phone, a PDA, a smartphone, a desktop computer, a netbook computer, a tablet computer, GPS device, gaming console, and/or a laptop computer. The architecture 2900 may be utilized to execute any aspect of the components presented herein. For example, the architecture 2900 depicted in FIG. 29 may be utilized to implement the devices 110 and 325 (FIGS. 3 and 4) and the architecture 2800 depicted in FIG. 28 may be utilized on the application servers 565 (FIG. 5) to implement the device state service 630 (FIGS. 6 and 10A-B).

The architecture 2900 illustrated in FIG. 29 includes a CPU (Central Processing Unit) 2902, a system memory 2904, including a RAM 2906 and a ROM 2908, and a system bus 2910 that couples the memory 2904 to the CPU 2902. A basic input/output system containing the basic routines that help to transfer information between elements within the architecture 2900, such as during startup, is stored in the ROM 2908. The architecture 2900 further includes a mass storage device 2912 for storing software code or other computer-executed code that is utilized to implement applications, the file system, and the operating system.

The mass storage device 2912 is connected to the CPU 2902 through a mass storage controller (not shown) connected to the bus 2910. The mass storage device 2912 and its associated computer-readable storage media provide non-volatile storage for the architecture 2900.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2900.

According to various embodiments, the architecture 2900 may operate in a networked environment using logical connections to remote computers through a network. The architecture 2900 may connect to the network through a network interface unit 2916 connected to the bus 2910. It may be appreciated that the network interface unit 2916 also may be utilized to connect to other types of networks and remote computer systems. The architecture 2900 also may include an input/output controller 2918 for receiving and processing input from a number of other devices, including a keyboard, mouse, or electronic stylus (not shown in FIG. 29). Similarly, the input/output controller 2918 may provide output to a display screen, a printer, or other type of output device (also not shown in FIG. 29).

It may be appreciated that the software components described herein may, when loaded into the CPU 2902 and executed, transform the CPU 2902 and the overall architecture 2900 from a general-purpose computing system into a special-purpose computing system customized to facilitate the functionality presented herein. The CPU 2902 may be constructed from any number of transistors or other discrete circuit elements, which may individually or collectively assume any number of states. More specifically, the CPU 2902 may operate as a finite-state machine, in response to executable instructions contained within the software modules disclosed herein. These computer-executable instructions may transform the CPU 2902 by specifying how the CPU 2902 transitions between states, thereby transforming the transistors or other discrete hardware elements constituting the CPU 2902.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2900 in order to store and execute the software components presented herein. It also may be appreciated that the architecture 2900 may include other types of computing devices, including handheld computers, embedded computer systems, smartphones, and PDAs known to those skilled in the art. It is also contemplated that the architecture 2900 may not include all of the components shown in FIG. 29, may include other components that are not explicitly shown in FIG. 29, or may utilize an architecture completely different from that shown in FIG. 29.

Figure 30:
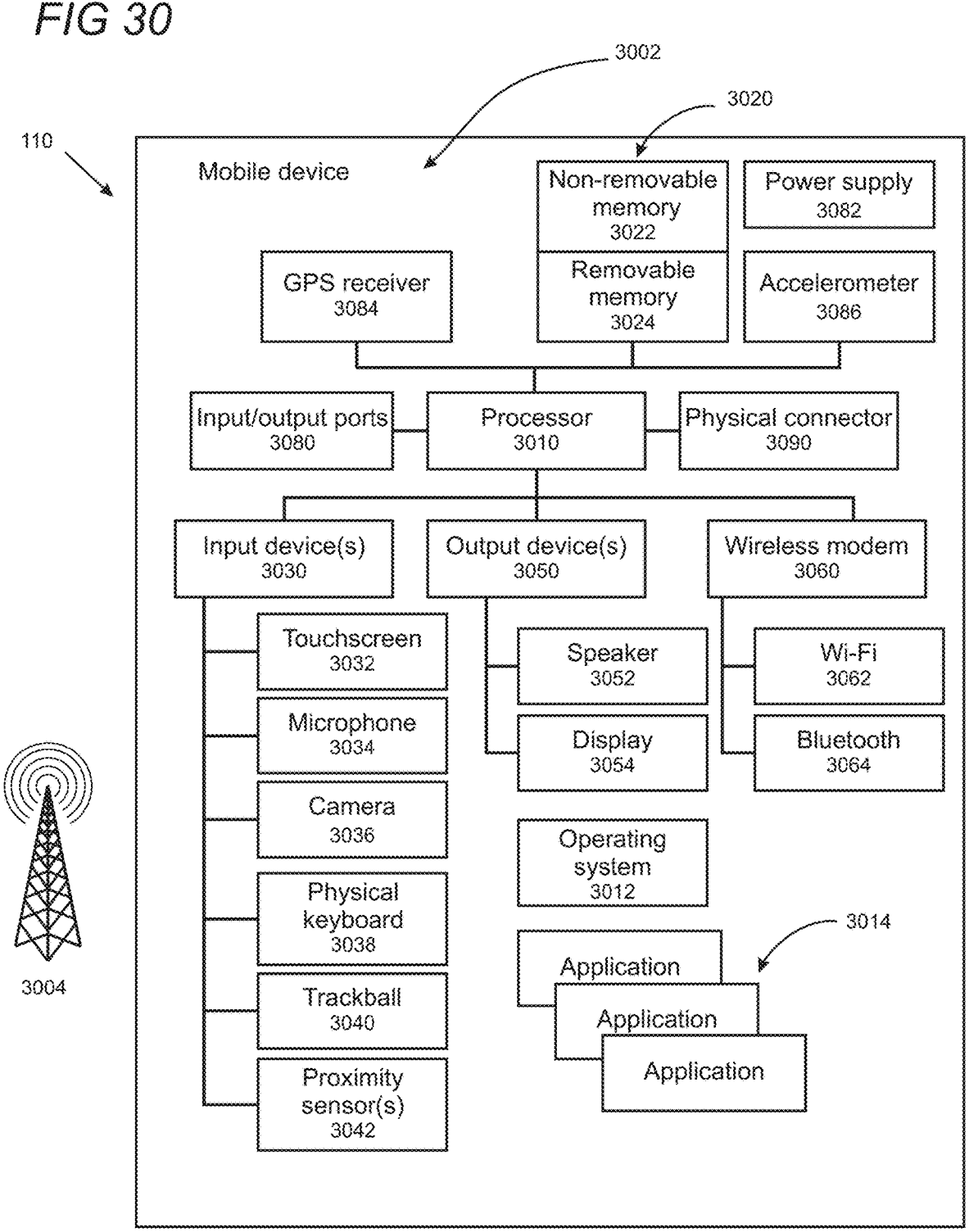
FIG. 30 is a block diagram of an illustrative device such as a mobile phone or smartphone.

FIG. 30 is a functional block diagram of an illustrative device 110 such as a mobile phone or smartphone including a variety of optional hardware and software components, shown generally at 3002. Any component 3002 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3004, such as a cellular or satellite network.

The illustrated device 110 can include a controller or processor 3010 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3012 can control the allocation and usage of the components 3002, including power states, above-lock states, and below-lock states, and provides support for one or more application programs 3014. The application programs can include common mobile computing applications (e.g., image-capture applications, email applications, calendars, contact managers, web browsers, messaging applications), or any other computing application.

The illustrated device 110 can include memory 3020. Memory 3020 can include non-removable memory 3022 and/or removable memory 3024. The non-removable memory 3022 can include RAM, ROM, Flash memory, a hard disk, or other well-known memory storage technologies. The removable memory 3024 can include Flash memory or a Subscriber Identity Module (SIM) card, which is well known in GSM (Global System for Mobile communications) systems, or other well-known memory storage technologies, such as "smart cards." The memory 3020 can be used for storing data and/or code for running the operating system 3012 and the application programs 3014. Example data can include web pages, text, images, sound files, video data, or other data sets to be sent to and/or received from one or more network servers or other devices via one or more wired or wireless networks.

The memory 3020 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 3020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 3030—such as a touchscreen 3032; microphone 3034 for implementation of voice input for voice recognition, voice commands and the like; camera 3036; physical keyboard 3038; trackball 3040; and/or proximity sensor 3042; and one or more output devices 3050—such as a speaker 3052 and one or more displays 3054. Other input devices (not shown) using gesture recognition may also be utilized in some cases. Other possible output devices (not shown) can include piezoelectric or haptic output devices. Some devices can serve more than one input/output function. For example, touchscreen 3032 and display 3054 can be combined into a single input/output device.

A wireless modem 3060 can be coupled to an antenna (not shown) and can support two-way communications between the processor 3010 and external devices, as is well understood in the art. The modem 3060 is shown generically and can include a cellular modem for communicating with the mobile communication network 3004 and/or other radio-based modems (e.g., Bluetooth® 3064 or Wi-Fi 3062). The wireless modem 3060 is typically configured for communication with one or more cellular networks, such as a GSM network for data and voice communications within a single cellular network, between cellular networks, or between the device and a public switched telephone network (PSTN).

The device can further include at least one input/output port 3080, a power supply 3082, a satellite navigation system receiver 3084, such as a GPS receiver, an accelerometer 3086, a gyroscope (not shown), and/or a physical connector 3090, which can be a USB port, IEEE 1394 (FireWire) port, and/or an RS-232 port. The illustrated components 3002 are not required or all-inclusive, as any components can be deleted and other components can be added.

Figure 31:
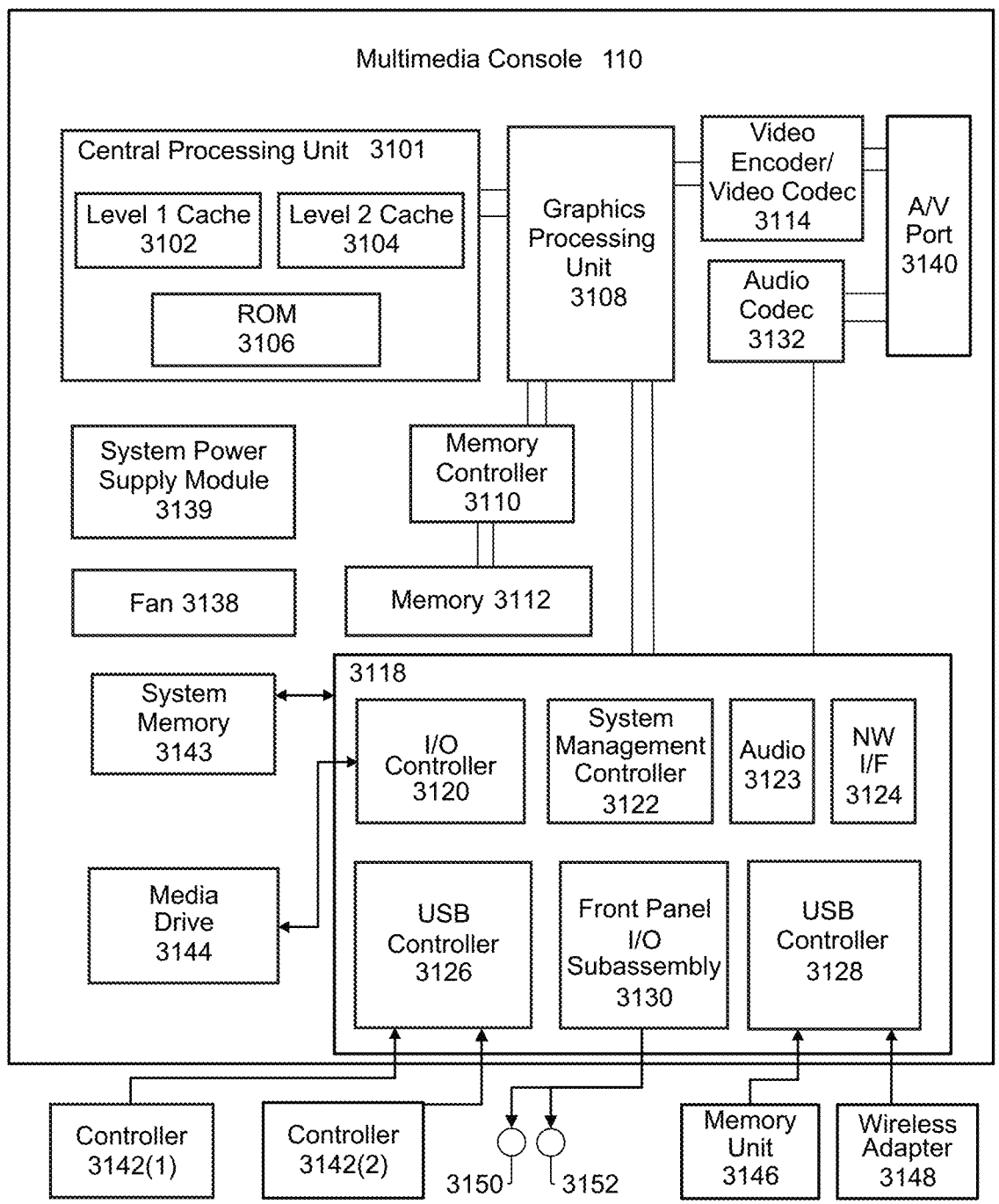
FIG. 31 is a block diagram of an illustrative multimedia console.

FIG. 31 is an illustrative functional block diagram of a multimedia console which may be embodied as a device 110 (FIG. 1). The multimedia console 110 has a central processing unit (CPU) 3101 having a level 1 cache 3102, a level 2 cache 3104, and a Flash ROM (Read Only Memory) 3106. The level 1 cache 3102 and the level 2 cache 3104 temporarily store data and hence reduce the number of memory access cycles, thereby improving processing speed and throughput. The CPU 3101 may be configured with more than one core, and thus, additional level 1 and level 2 caches 3102 and 3104. The Flash ROM 3106 may store executable code that is loaded during an initial phase of a boot process when the multimedia console 110 is powered ON.

A graphics processing unit (GPU) 3108 and a video encoder/video codec (coder/decoder) 3114 form a video processing pipeline for high speed and high resolution graphics processing. Data is carried from the GPU 3108 to the video encoder/video codec 3114 via a bus. The video processing pipeline outputs data to an A/V (audio/video) port 3140 for transmission to a television or other display. A memory controller 3110 is connected to the GPU 3108 to facilitate processor access to various types of memory 3112, such as, but not limited to, a RAM.

The multimedia console 110 includes an I/O controller 3120, a system management controller 3122, an audio processing unit 3123, a network interface controller 3124, a first USB (Universal Serial Bus) host controller 3126, a second USB controller 3128, and a front panel I/O subassembly 3130 that are preferably implemented on a module 3118. The USB controllers 3126 and 3128 serve as hosts for peripheral controllers 3142(1) and 3142(2), a wireless adapter 3148, and an external memory device 3146 (e.g., Flash memory, external CD/DVD ROM drive, removable media, etc.). The network interface controller 3124 and/or wireless adapter 3148 provide access to a network (e.g., the Internet, home network, etc.) and may be any of a wide variety of various wired or wireless adapter components including an Ethernet card, a modem, a Bluetooth® module, a cable modem, or the like.

System memory 3143 is provided to store application data that is loaded during the boot process. A media drive 3144 is provided and may comprise a DVD/CD drive, hard drive, or other removable media drive, etc. The media drive 3144 may be internal or external to the multimedia console 110. Application data may be accessed via the media drive 3144 for execution, playback, etc. by the multimedia console 110. The media drive 3144 is connected to the I/O controller 3120 via a bus, such as a Serial ATA bus or other high speed connection (e.g., IEEE 1394).

The system management controller 3122 provides a variety of service functions related to assuring availability of the multimedia console 110. The audio processing unit 3123 and an audio codec 3132 form a corresponding audio processing pipeline with high fidelity and stereo processing. Audio data is carried between the audio processing unit 3123 and the audio codec 3132 via a communication link. The audio processing pipeline outputs data to the A/V port 3140 for reproduction by an external audio player or device having audio capabilities.

The front panel I/O subassembly 3130 supports the functionality of the power button 3150 and the eject button 3152, as well as any LEDs (light emitting diodes) or other indicators exposed on the outer surface of the multimedia console 110. A system power supply module 3139 provides power to the components of the multimedia console 110. A fan 3138 cools the circuitry within the multimedia console 110.

The CPU 3101, GPU 3108, memory controller 3110, and various other components within the multimedia console 110 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 110 is powered ON, application data may be loaded from the system memory 3143 into memory 3112 and/or caches 3102 and 3104 and executed on the CPU 3101. The application may present a graphical user interface that provides a consistent user experience when navigating to different media types available on the multimedia console 110. In operation, applications and/or other media contained within the media drive 3144 may be launched or played from the media drive 3144 to provide additional functionalities to the multimedia console 110.

The multimedia console 110 may be operated as a standalone system by simply connecting the system to a television or other display. In this standalone mode, the multimedia console 110 allows one or more users to interact with the system, watch movies, or listen to music. However, with the integration of broadband connectivity made available through the network interface controller 3124 or the wireless adapter 3148, the multimedia console 110 may further be operated as a participant in a larger network community.

When the multimedia console 110 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation is preferably large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 110 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 3101 at predetermined times and intervals to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 3142(1) and 3142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present notifications to all devices to update state are now presented by way of illustration and not as an exhaustive list of all embodiments. An example includes a method to execute an action on a communication-inactive computing device based on a device state of a communication-active computing device, the method comprising: collecting the device state of the communication-active computing device, wherein the device state includes a communication state of a call or messaging session being conducted on the communication-active computing device; as the communication is conducted on the communication-active computing device, determining an action for performance by the communication-inactive computing device based on the collected device state; and transmitting the determined action to the communication-inactive computing device.

In another example, the communication is either an incoming or outgoing call or a messaging session, and the call state includes one of ringing, busy signal, network status signal, call in-progress, leaving voicemail, checking voicemail, receiving a message, transmitting a message, or inputting a message. In another example, the determined action includes switching the communication-inactive computing device on or off, adjusting a setting of the communication-inactive computing device, handing off the call from the communication-active computing device to the communication-inactive computing device, interoperating components of the communication-active and communication-inactive computing devices, entering power-save mode, performing a system update, performing an application update, or performing maintenance. In another example, the method further comprises: receiving at least one of context data and sensor data associated with the communication-active computing device and the communication-inactive computing device; and the determined action for the communication-inactive computing device being based on the device state of the communication-active computing device and at least one of the received context data or sensor data. In another example, the context data of the communication-active computing device includes a current location of the communication-active computing device relative to the communication-inactive computing device, wherein the determined action for the communication-inactive computing device includes, when the communication-active computing device is within a pre-determined threshold proximity to the communication-inactive computing device or the current location is undetermined, adjusting a setting of the communication-inactive computing device. In another example, the context data includes device capabilities of the communication-inactive computing device and communication-active computing device; comprising: comparing the device capabilities of the active computing device with the communication-inactive computing device; determining whether one or more device capabilities of the communication-inactive computing device operates at a better performance level than the communication-active computing device; and wherein the determined action is to arrange a User Interface (UI) of the communication-inactive computing device with a window that provides an option to switch an active video and/or audio call from the communication-active computing device to the communication-inactive computing device. In another example, the device capabilities include a type of connection, processor performance, display clarity, speaker clarity, or microphone clarity. In another example, the context data includes device capabilities of a computing device, and further comprising: comparing the device capabilities of the communication-active computing device with the communication-inactive computing device; determining whether one or more device capabilities of the communication-inactive computing device operate at a better performance level than on the communication-active computing device; and wherein the determined action is to arrange a User Interface (UI) of the communication-inactive computing device with a window that provides an option to interoperate components of the communication-inactive computing device with the communication-active computing device. In another example, interoperating the components includes: disabling a component on the communication-active computing device; and enabling a component on the communication-inactive computing device. In another example, the context data includes location of the communication-active and communication-inactive computing devices, current actions of the communication-active or communication-inactive computing devices, battery level of the communication-inactive computing device, performance level of hardware, information of an active communication, and identified key words in the active communication.

A further example includes a computing device, comprising: one or more processors; a user interface (UI) configured to enable interactions with a user of the computing device; and a hardware-based memory device storing computer-readable instructions which, when executed by the one or more processors, cause the computing device to: receive device state data and one or more of context data and sensor data, wherein the device state data includes a current status of an active video and/or audio call or messaging session on an active computing device; determine an action for the computing device during the active video and/or audio call or messaging session based on the received device state data and the one or more of the context data and sensor data; and perform the determined action.

In another example, the executed instructions further cause the device to: arrange the UI of the computing device with a window that provides an option to adjust a setting associated with the computing device. In another example, the call includes either an incoming or outgoing call, and the current status of the active video and/or audio call includes any one of ringing, busy signal, or in-progress. In another example, the determined action includes switching the computing device on or off, adjusting a setting of the device, connecting to the active video and/or audio call, enabling a component, entering power-save mode, and performing system and/or application updates. In another example, the adjusting a setting includes adjusting a volume, playing/pausing the device, or locking/unlocking a door. In another example, the sensor data includes one or more of an inferred activity level of a user, inferred stress or anxiety level of a user, or location data.

A further example includes one or more hardware-based computer-readable memory devices storing instructions which, when executed by one or more processors disposed in a computer server, cause the computer server to: receive device state and one or more of context data and sensor data for an active computing device, wherein the device state includes a current status of an active video and/or audio call between the active computing device and a calling party; determine a location associated with the active computing device and a subject computing device using at least one of the context data or sensor data; determine an action for the active computing device and the subject computing device during the active video and/or audio call based on the received device state and the determined locations; and transmit the determined action to the subject computing device and the active computing device.

In another example, the determined action is based on the active and subject computing devices being within a threshold proximate distance from each other. In another example, the sensor data of the active device indicates an inferred activity level for a user, and wherein the action is further determined based on the inferred activity level of the user. In another example, the executed instructions further cause the computer server to receive identified key words spoken by a user while on the active audio and/or video call, and the action is further determined based on the identified key words.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method to execute an action on computing devices, including a communication-inactive computing device, based on a device state of a communication-active computing device, the method comprising:
   implementing a device state service using an application layer of an Internet Protocol Multimedia Subsystem (IMS) network that comprises an IMS layer and a transport layer, wherein the IMS layer controls interactions between computing devices and the device state service, and wherein the transport layer provides access to the IMS network from the computing devices using SIP (Session Initiation Protocol) messaging;
   using the device state service to collect, in real time, the device state of the communication-active computing device that is determined by the IMS layer, wherein the device state includes a current status of an active call or messaging session conducted over the IMS network with which the communication-active computing device is currently engaged;
   as the call or messaging session is conducted over the IMS network on the communication-active computing device, determining an action by the device state service for controlling an operation performed by the communication-inactive computing device based on the collected device state, in which each of the communication-active and communication-inactive devices are associated with a common end user by a unique identifier to commonly identify the communication-active and communication-inactive devices to the IMS network, and the communication-active device is engaged in the current call or messaging session over the IMS network and the communication-inactive device is not engaged in the current call or messaging session over the IMS network; and
   transmitting the determined action from the device state service to the communication-inactive computing device over the IMS network using the SIP messaging to control the operation performed by the communication-inactive computing device in response to the determined action.

2. The method of claim 1, wherein a communication to the communication-active computing device is either an incoming or outgoing call or a messaging session, and the call state includes one of ringing, busy signal, network status signal, call in-progress, leaving voicemail, checking voicemail, receiving a message, transmitting a message, or inputting a message.

3. The method of claim 1, wherein the determined action includes switching the communication-inactive computing device on or off, adjusting a setting of the communication-inactive computing device, handing off the call from the communication-active computing device to the communication-inactive computing device, interoperating components of the communication-active and communication-inactive computing devices, entering power-save mode, performing a system update, performing an application update, or performing maintenance.

4. The method of claim 3, wherein interoperating the components includes:
disabling a component on the communication-active computing device; and
enabling a component on the communication-inactive computing device.

5. The method of claim 1, further comprising:
receiving at least one of context data and sensor data associated with the communication-active computing device and the communication-inactive computing device; and
the determined action for the communication-inactive computing device being based on the device state of the communication-active computing device and at least one of the received context data or sensor data.

6. The method of claim 5, wherein the context data of the communication-active computing device includes a current location of the communication-active computing device relative to the communication-inactive computing device, wherein the determined action for the communication-inactive computing device includes, when the communication-active computing device is within a pre-determined threshold proximity to the communication-inactive computing device or the current location is undetermined, adjusting a setting of the communication-inactive computing device.

7. The method of claim 5, wherein the context data includes device capabilities of the communication-inactive computing device and communication-active computing device; comprising:
comparing the device capabilities of the communication-active computing device with the communication-inactive computing device;
determining whether one or more device capabilities of the communication-inactive computing device operate at a better performance level than the communication-active computing device; and
wherein the determined action is to arrange a User Interface (UI) of the communication-inactive computing device with a window that provides an option to switch an active video or audio call from the communication-active computing device to the communication-inactive computing device.

8. The method of claim 7, wherein the device capabilities include a type of connection, processor performance, display clarity, speaker clarity, or microphone clarity.

9. The method of claim 5, wherein the context data includes device capabilities of a computing device, and further comprising:
comparing the device capabilities of the communication-active computing device with the communication-inactive computing device;
determining whether one or more device capabilities of the communication-inactive computing device operate at a better performance level than on the communication-active computing device; and
wherein the determined action is to arrange a User Interface (UI) of the communication-inactive computing device with a window that provides an option to interoperate components of the communication-inactive computing device with the communication-active computing device.

10. The method of claim 5, wherein the context data includes location of the communication-active and communication-inactive computing devices, current actions of the communication-active or communication-inactive computing devices, battery level of the communication-inactive computing device, performance level of hardware, information of an active communication, and identified key words in the active communication.

11. A computing device that is communication-inactive, comprising:
one or more processors;
a network interface providing a connection to an Internet Protocol Multimedia Subsystem (IMS) network that comprises an application layer, an IMS layer, and a transport layer, wherein the IMS layer controls interactions between computing devices and the device state service, and wherein the transport layer provides access to the IMS network from the computing devices using SIP (Session Initiation Protocol) messaging;
a user interface (UI) configured to enable interactions with a user of the computing device; and
a hardware-based memory device storing computer-readable instructions which, when executed by the one or more processors, cause the computing device to:
receive device state data and one or more of context data, device capabilities, and sensor data in real time from a device state service that is operable on the application layer of the IMS network to trigger execution of an action on the communication-inactive computing device, wherein the device state data is collected by the device state service and includes a determination by the IMS layer of a current status of an active video or audio call or messaging session conducted over the IMS network on a communication-active computing device, wherein each of the communication-active and communication-inactive computing devices are associated with a common end user by a unique identifier to commonly identify the communication-active and communication-inactive devices to the IMS network, and wherein the communication-active computing device is engaged in the active video or audio call or messaging session over the IMS network and the communication-inactive computing device is not engaged in the active video or audio call or messaging session over the IMS network;
determine an action for execution by the communication-inactive computing device, during the active video or audio call or messaging session, responsive to the device state data and the one or more of the context data, device capabilities, and sensor data received from the device state service; and
trigger execution of the determined action to control the operation at the communication-inactive computing device from the communication-active computing device during the active video or audio call or messaging session over the IMS network.

12. The computing device of claim 11, in which the executed instructions further cause the device to:
arrange the UI of the computing device with a window that provides an option to adjust a setting associated with the computing device.

13. The computing device of claim 11, wherein the call includes either an incoming or outgoing call, and the current status of the active video or audio call includes any one of ringing, busy signal, or in-progress.

14. The computing device of claim 11, wherein the determined action includes switching the computing device on or off, adjusting a setting of the device, connecting to the active video or audio call, enabling a component, entering power-save mode, and performing system or application updates.

15. The computing device of claim 14, wherein the adjusting a setting includes adjusting a volume, playing or pausing the device, or locking or unlocking a door.

16. The computing device of claim 11, wherein the sensor data includes one or more of an inferred activity level of a user, inferred stress or anxiety level of a user, or location data.

17. One or more hardware-based computer-readable memory devices storing instructions which, when executed by one or more processors disposed in a computer server, cause the computer server to:
   implement a device state service using an application layer of an Internet Protocol Multimedia Subsystem (IMS) network that comprises an IMS layer and a transport layer, wherein the IMS layer controls interactions between computing devices and the device state service, and wherein the transport layer provides access to the IMS network from the computing devices using SIP (Session Initiation Protocol) messaging;
   receive device state and one or more of context data and sensor data for a communication-active computing device at the device state service, wherein the device state includes a determination by the IMS layer of a current status of an active video or audio call conducted over the IMS network between the communication-active computing device and a device associated with a calling party;
   determine, by the device state service, a location associated with the communication-active computing device and a communication-inactive computing device using at least one of the context data or sensor data;
   determine, by the device state service, one or more actions to control respective operations performed by each of the communication-active computing device and the communication-inactive computing device, in which the determination is made in real time by the device state service during the active video or audio call based on the received device state and the determined location; and
   transmit the determined one or more actions, over the IMS network from the device state service to the communication-active computing device and the communication-inactive computing device, to control performance of respective operations by the communication-active computing device and the communication-inactive computing device in response to the determined one or more actions, in which each of the communication-active and communication-inactive devices are associated with a common end user by a unique identifier to commonly identify the communication-active and communication-inactive devices to the IMS network, and the communication-active device is engaged in the currently active video call or audio call over the IMS network and the communication-inactive device is not engaged in the currently active video call or audio call over the IMS network.

18. The one or more hardware-based computer-readable memory devices of claim 17, wherein the determined action is based on the communication-active and communication-inactive computing devices being within a threshold proximate distance from each other.

19. The one or more hardware-based computer-readable memory devices of claim 18, wherein the sensor data of the communication-active device indicates an inferred activity level for a user, and wherein the action is further determined based on the inferred activity level of the user.

20. The one or more hardware-based computer-readable memory devices of claim 18, wherein the executed instructions further cause the computer server to receive identified key words spoken by a user while on the active audio or video call, and the one or more actions are further determined based on the identified key words.

* * * * *